United States Patent
Bai et al.

(10) Patent No.: US 12,477,549 B2
(45) Date of Patent: Nov. 18, 2025

(54) SDCI MTRP UNIFIED TCI ACTIVATION DESIGN

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 488 days.

(21) Appl. No.: 17/816,355

(22) Filed: Jul. 29, 2022

(65) Prior Publication Data
US 2024/0049239 A1 Feb. 8, 2024

(51) Int. Cl.
*H04W 72/04* (2023.01)
*H04W 72/044* (2023.01)
*H04W 72/23* (2023.01)
*H04W 76/20* (2018.01)
*H04W 80/02* (2009.01)

(52) U.S. Cl.
CPC ......... *H04W 72/23* (2023.01); *H04W 72/046* (2013.01); *H04W 76/20* (2018.02); *H04W 80/02* (2013.01)

(58) Field of Classification Search
CPC .. H04L 5/0023; H04L 5/0091; H04W 72/046; H04W 72/23; H04W 76/20; H04W 80/02
See application file for complete search history.

(56) References Cited

PUBLICATIONS

Sony ("Consideration on Unified TCI framework for multi-TRP"; R1-2203723; e-Meeting, May 9-20, 2022) (Year: 2022).*
Spreadtrum Communications ("Discussion on unified TCI framework extension for multi-TRP"; R1-2203320; e-Meeting, May 9-20, 2022) (Year: 2022).*
International Search Report and Written Opinion—PCT/US2023/026638—ISA/EPO—Oct. 31, 2023.

(Continued)

*Primary Examiner* — Melvin C Marcelo
*Assistant Examiner* — Natali Pascual Peguero
(74) *Attorney, Agent, or Firm* — Procopio, Cory, Hargreaves & Savitch LLP/Qualcomm Incorporated

(57) ABSTRACT

A network node may transmit an RRC message to a UE. The RRC message may include a configuration of a plurality of TCI states. The network node may transmit one or more MAC-CEs to the UE. The one or more MAC-CEs may include a configuration of a plurality of codepoints. Each codepoint in the plurality of codepoints may be associated with one or more TRPs in a plurality of TRPs of the network node. The plurality of codepoints may be associated with at least one first TCI state for an uplink communication and at least one second TCI state for a downlink communication. The network node may transmit a single DCI message to the UE. The single DCI message may be indicative of at least one codepoint in the plurality of codepoints. The network node may communicate with the UE based on the at least one codepoint.

30 Claims, 15 Drawing Sheets

(56) References Cited

PUBLICATIONS

Sony: "Consideration on Unified TCI Framework for Multi-TRP", 3G PP TSG RAN WG 1 #1 09-e, R1-2203723, 3rd Generation Partnership Project, Mobile Competence Centre, 650, Route Des Lucioles, F-06921, Sophia-Antipolis Cedex, France, vol. RAN WG1, No. e-Meeting; May 9, 2022-May 20, 2022, Apr. 29, 2022, 3 pages, XP052153140, sections 1-3, Figure 1.

Spreadtrum Communications: "Discussion on Unified TCI Framework Extension for Multi-TRP", 3GPP TSG RAN WG1 #109-e, R1-2203320, 3rd Generation Partnership Project, Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, 5 pages, XP052152915, Sections 1-3, Figures 1-3.

3GPP: "3rd Generation Partnership Project; Technical Specification Group Radio Access Network; NR; Medium Access Control (MAC) protocol specification (Release 17)" 3GPP TS 38.321 V17.1.0, Jun. 2022, pp. 1-240, 650 Route des Lucioles, Sophia Antipolis, Valbonne, France, sections 8.18.23 and 6.1.3.47.

\* cited by examiner

| R | Serving Cell ID | | | | | DL BWP ID | Oct 1 |
|---|---|---|---|---|---|---|---|
| R | R | R | R | R | R | UL BWP ID | Oct 2 |
| $P_1$ 502 | $P_2$ 502 | $P_3$ 502 | $P_4$ 502 | $P_5$ 502 | $P_6$ 502 | $P_7$ 502 | $P_8$ 502 | Oct 3 |
| D/L 504 | TCI state ID 1 506 | | | | | | Oct 4 |
| D/L 504 | TCI state ID 2 506 | | | | | | Oct 5 |
| ... | | | | | | | |
| D/L 504 | TCI state ID N 506 | | | | | | Oct N+3 |

Oct: Octet

FIG. 5

| R | | | Serving Cell ID | DL BWP ID | | |
|---|---|---|---|---|---|---|
| R | R | R | R | R | UL BWP ID | |
| $Q_1$ 802 | $Q_2$ 802 | | ... | | $Q_{N'}$ 802 | |
| TRP ID 808 | D/L 804 | | TCI state ID 1 806 | | | |
| TRP ID 808 | D/L 804 | | TCI state ID 2 806 | | | |
| ... | | | | | | |
| TRP ID 808 | D/L 804 | | TCI state ID N 806 | | | |

SDCI MTRP UNIFIED TCI ACTIVATION DESIGN

TECHNICAL FIELD

The present disclosure relates generally to communication systems, and more particularly, to unified transmission configuration indicator (TCI) state configuration for multi-transmit receive point (TRP) operation in a wireless communication system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may receive a radio resource control (RRC) message from a network node. The RRC message may include a configuration of a plurality of transmission configuration indicator (TCI) states. Each TCI state in the plurality of TCI states may be associated with a respective TCI state identifier (ID). The apparatus may receive one or more medium access control-control elements (MAC-CEs) from the network node. The one or more MAC-CEs may include a configuration of a plurality of codepoints. Each codepoint in the plurality of codepoints may be associated with one or more transmit receive points (TRPs) in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The apparatus may receive a single downlink control information (DCI) message from the network node. The single DCI message may be indicative of at least one codepoint in the plurality of codepoints. The apparatus may communicate with the network node based on the at least one codepoint.

In an aspect of the disclosure, a method, a computer-readable medium, and an apparatus are provided. The apparatus may be a network node. The apparatus may transmit an RRC message to a UE. The RRC message may include a configuration of a plurality of TCI states. Each TCI state in the plurality of TCI states may be associated with a respective TCI state ID. The apparatus may transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The apparatus may transmit a single DCI message to the UE. The single DCI message may be indicative of at least one codepoint in the plurality of codepoints. The apparatus may communicate with the UE based on the at least one codepoint.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 5 is a diagram of an example MAC-CE associated with activating unified TCI states for single TRP operation.

DETAILED DESCRIPTION

Figure 1:
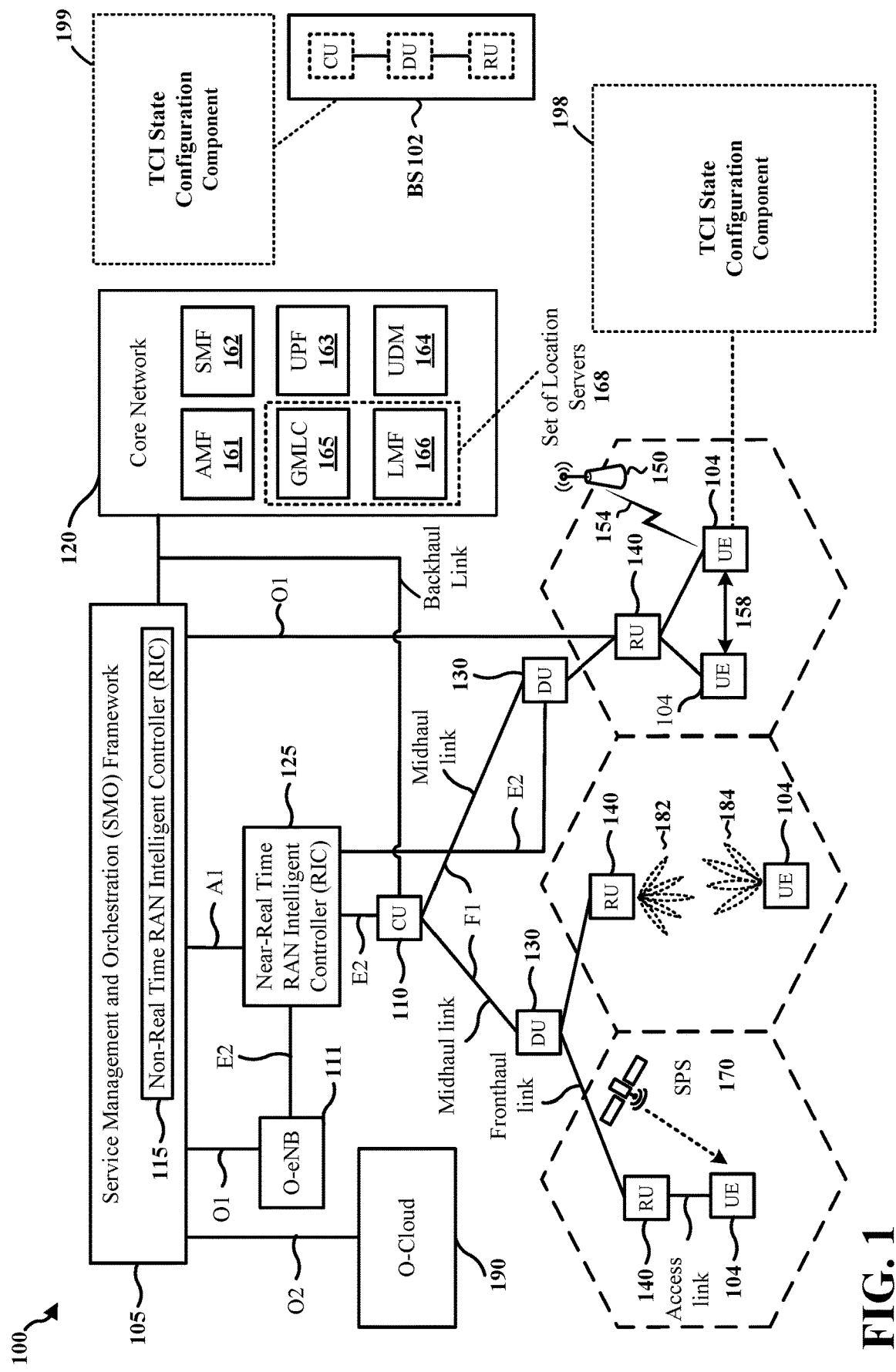
FIG. 1 is a diagram illustrating an example of a wireless communications system and an access network.

Based on a unified TCI framework, TCI states for both the uplink and the downlink may be configured, activated, and/or indicated using same messages. There may be a need to extend the unified TCI framework to the multi-TRP use case as simultaneous multi-panel uplink transmission using the multi-TRP configuration may help to achieve treater throughput and/or reliability for the uplink, especially in higher bands (e.g., FR2).

In one or more aspects, a network node may transmit an RRC message to a UE. The RRC message may include a configuration of a plurality of TCI states. Each TCI state in the plurality of TCI states may be associated with a respective TCI state ID. The network node may transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The network node may transmit a single DCI message to the UE. The single DCI message may be indicative of at least one codepoint in the plurality of codepoints. The network node may communicate with the UE based on the at least one codepoint. Accordingly, unified TCI states may be configured, activated, and/or indicated for multi-TRP operation.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/ purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include a TCI state configuration component 198 that may be configured to receive an RRC message from a network node. The RRC message may include a configuration of a plurality of TCI states. Each TCI state in the plurality of TCI states may be associated with a respective TCI state ID. The TCI state configuration component 198 may be configured to receive one or more MAC-CEs from the network node. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The TCI state configuration component 198 may be configured to receive a single DCI message from the network node. The single DCI message may be indicative of at least one codepoint in the plurality of codepoints. The TCI state configuration component 198 may be configured to communicate with the network node based on the at least one codepoint. In certain aspects, the base station 102 may include a TCI state configuration component 199 that may be configured to transmit an RRC message to a UE. The RRC message may include a configuration of a plurality of TCI states. Each TCI state in the plurality of TCI states may be associated with a respective TCI state ID. The TCI state configuration component 199 may be configured to transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The TCI state configuration component 199 may be configured to transmit a single DCI message to the UE. The single DCI message may be indicative of at least one codepoint in the plurality of codepoints. The TCI state configuration component 199 may be configured to communicate with the UE based on the at least one codepoint. Although the following description may be focused on 5G NR, the concepts described herein may be applicable to other similar areas, such as LTE, LTE-A, CDMA, GSM, and other wireless technologies.

Figure 2:
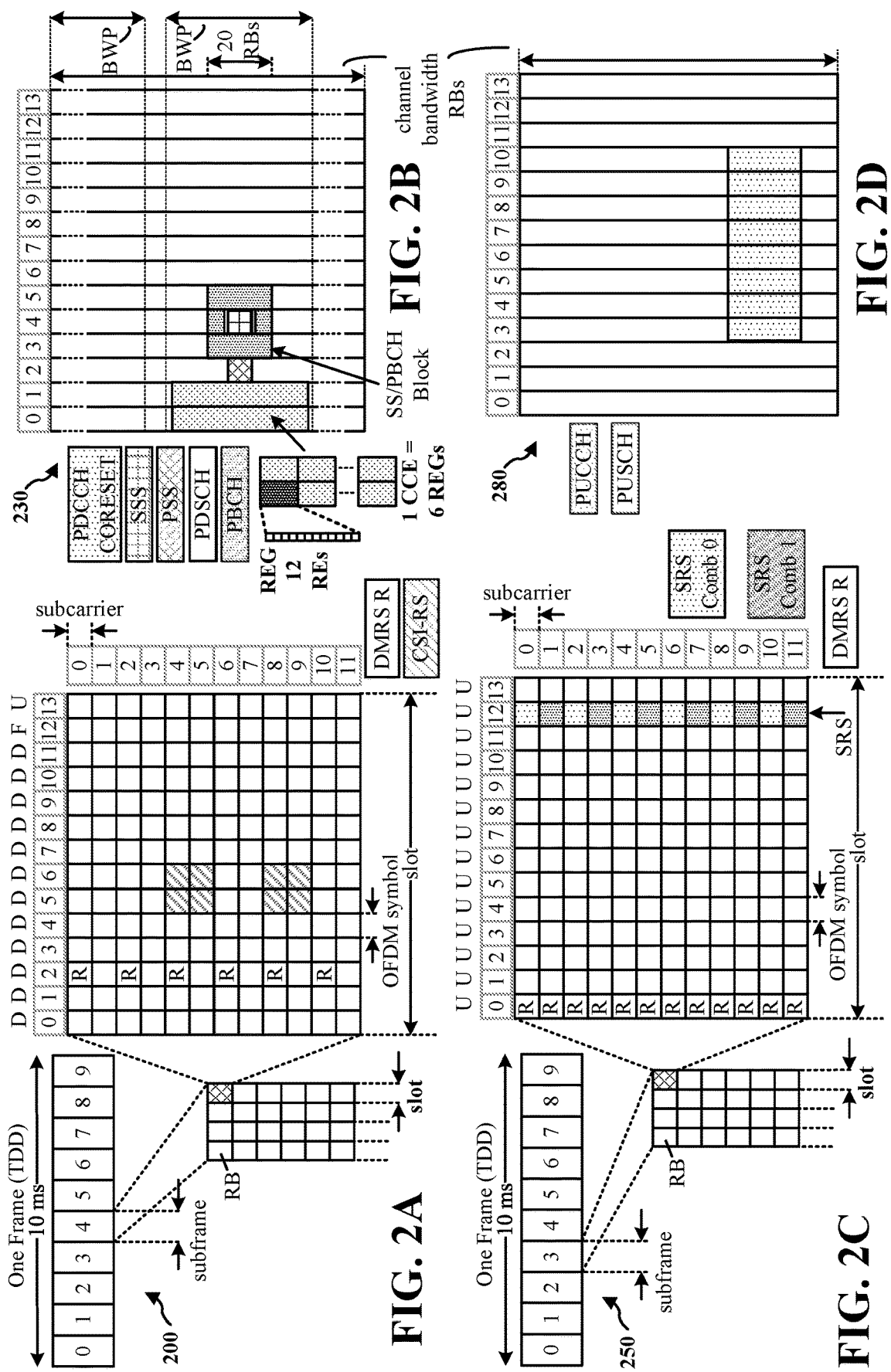
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^{\mu} \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
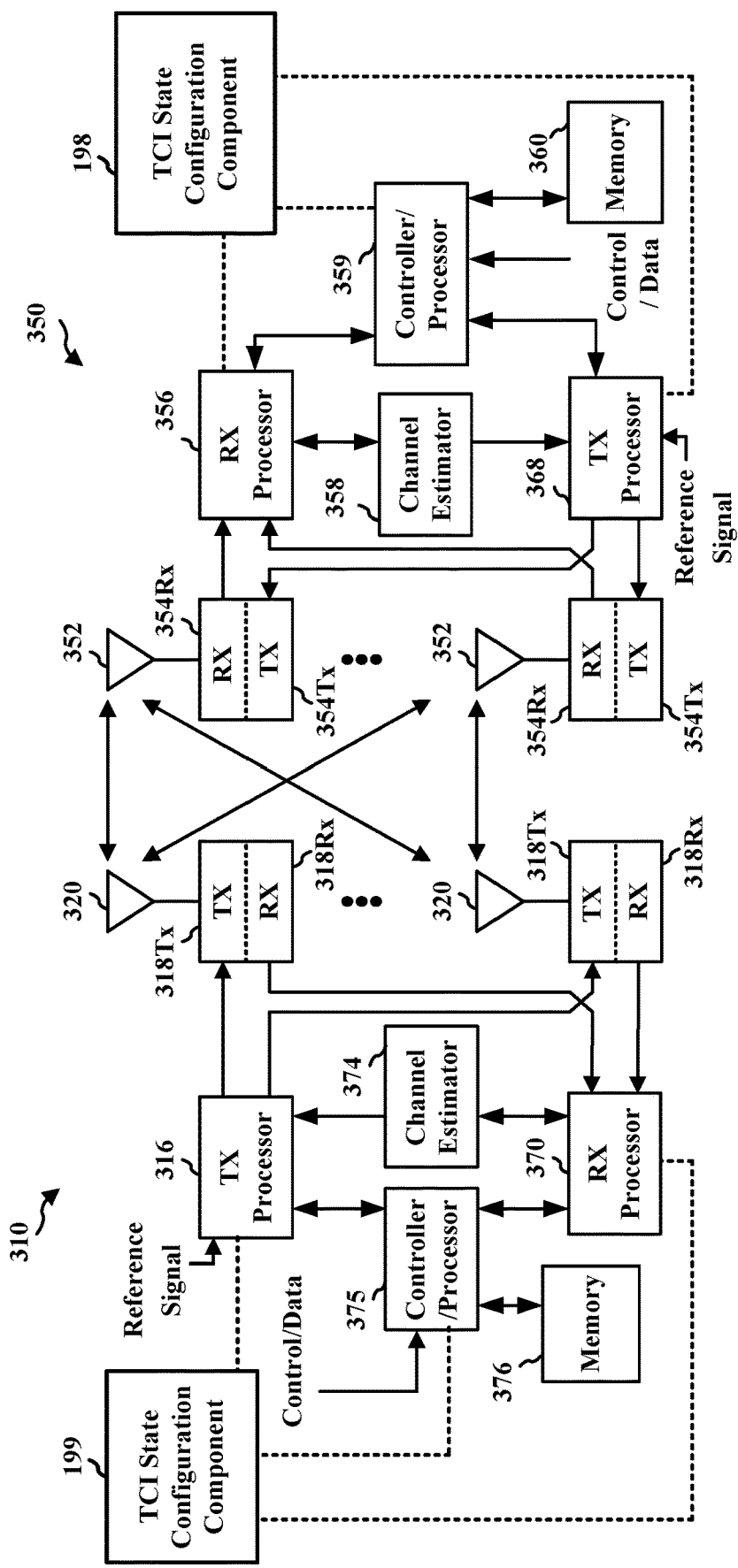
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE

350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the TCI state configuration component 198 of FIG. 1.

At least one of the TX processor 316, the RX processor 370, and the controller/processor 375 may be configured to perform aspects in connection with the TCI state configuration component 199 of FIG. 1.

Based on a unified TCI framework, TCI states for both the uplink and the downlink may be configured, activated, and/or indicated using same signaling messages (e.g., a same MAC-CE may activate TCI states for both the uplink and the downlink, and a same DCI message may indicate TCI states for both the uplink and the downlink). There may be a need to extend the unified TCI framework to the multi-TRP use case as simultaneous multi-panel uplink transmission using the multi-TRP configuration may help to achieve greater throughput and/or reliability for the uplink, especially in higher bands (e.g., FR2). The technique may be applicable to various types of devices including, e.g., the customer premises equipment (CPE), the fixed wireless access (FWA) device, vehicles, or industrial devices.

In some configurations, the precoding indication may be provided for the uplink (e.g., for the PUSCH). In some configurations, no new codebook may be used for the multi-panel simultaneous transmission. In some configurations, the total number of layers may be up to four across all panels; further, the total number of codewords may be up to two across all panels. In different configurations, the multi-TRP operation including the precoding indication may be single DCI-based (e.g., a single DCI message may indicate TCI states and/or schedule transmissions for the multiple TRPs) or multi-DCI based (e.g., multiple DCI messages may be used to indicate TCI states and/or schedule transmissions for the multiple respective TRPs).

In some configurations, the beam indication may be provided for the uplink (e.g., for the PUCCH/PUSCH). In different configurations, the multi-TRP operation including the beam indication may be single DCI-based or multi-DCI based.

In some configurations, for the multi-DCI based multi-TRP operation, two PUSCHs or two PUCCHs may be transmitted across two panels in a same component carrier.

Herein TCI state may include quasi co-location (QCL) information that the UE can use to derive timing/frequency error and/or transmission/reception spatial filtering for transmitting/receiving a signal. Two antenna ports are said to be quasi co-located (QCL'ed) if properties of the channel over which a symbol on one antenna port is conveyed can be inferred from the channel over which a symbol on the other antenna port is conveyed. The network node may indicate a TCI state to the UE as a transmission configuration that indicates QCL relationships between one signal (e.g., a reference signal) and the signal to be transmitted/received. For example, a TCI state may indicate a QCL relationship between DL RSs in one RS set and PDSCH/PDCCH DM-RS ports.

Under a unified TCI framework, different types of unified TCI states may be indicated. For example, a first type of TCI state may be a joint DL/UL TCI state to indicate a TCI state for at least one DL channel (e.g., PDSCH/PDCCH) or RS and at least one UL channel (e.g., PUSCH/PUCCH) or RS. A second type of TCI state may be a separate DL (e.g., separate from UL) TCI state to indicate a TCI state for at least one DL channel (e.g., PDSCH/PDCCH) or RS. A third type of TCI state may be a separate UL TCI state to indicate a TCI state for at least one UL channel (e.g., PUSCH/PUCCH) or RS. An example RS may be an SSB, a tracking reference signal (TRS) and the associated CSI-RS for tracking, a CSI-RS for beam management, a CSI-RS for CQI management, a DM-RS associated with non-UE-dedicated reception on PDSCH and a subset (which may be a full set) of CORESETs, or the like.

A pool of unified TCI states may be RRC configured. For the single TRP operation, a UE may receive a MAC-CE activating one or more TCI state codepoints associated with one or more TCI states. The UE may then receive a DCI message indicating one TCI state codepoint associated with one TCI state of the one or more TCI states (which may be alternatively referred to as indicating one TCI state) and the UE may keep using the one TCI state until a separate DCI message indicating another TCI state is received. Different formats of DCI may provide different scheduling. In some aspects, to indicate one TCI state codepoint representing (1) a pair of UL TCI state and DL TCI state or (2) a single DL TCI state, a single UL TCI state, or a joint TCI state, the DCI format 1_1 or format 1_2 may be used. In some aspects, with DL assignment, to indicate the TCI state, a TCI field in the DCI message may represent a TCI state ID.

For the multi-TRP operation, the DCI message may indicate more than one unified TCI state. For example, one TCI state (or more) may be indicated for each TRP.

Table 2 below may provide examples of channels/RSs associated with different types of TCI states (once activated):

TABLE 2

| TCI state type | Associated channel/RS | Associated channel/RS that may be configured (e.g., in RRC) |
| --- | --- | --- |
| Separate DL TCI | UE dedicated PDCCH and PDSCH | Non-UE dedicated PDCCH and PDSCH, aperiodic (AP) CSI-RS for CSI, AP CSI-RS for beam management |
| Separate UL TCI | UE dedicated PUSCH (dynamic grant and configured grant based) and PUCCH | SRS for codebook based (CB)/non-codebook based (NCB)/antenna switching (AS), AP SRS for beam management |
| Joint DL and UL TCI | UE dedicated PDCCH and PDSCH or UE dedicated PUSCH (dynamic grant or configured grant based) and PUCCH | Non-UE dedicated PDCCH and PDSCH, AP CSI-RS for CSI, AP CSI-RS for beam management or SRS for CB/NCB/AS, AP SRS for beam management |

In some configurations, a network node may transmit a DCI message (e.g., format 1_1 or 1_2) to a UE, where the DCI message may indicate one or more TCI states and may schedule a downlink channel (e.g., a PDSCH) (scheduling a downlink transmission may also be referred to as scheduling a downlink assignment).

Figure 4:
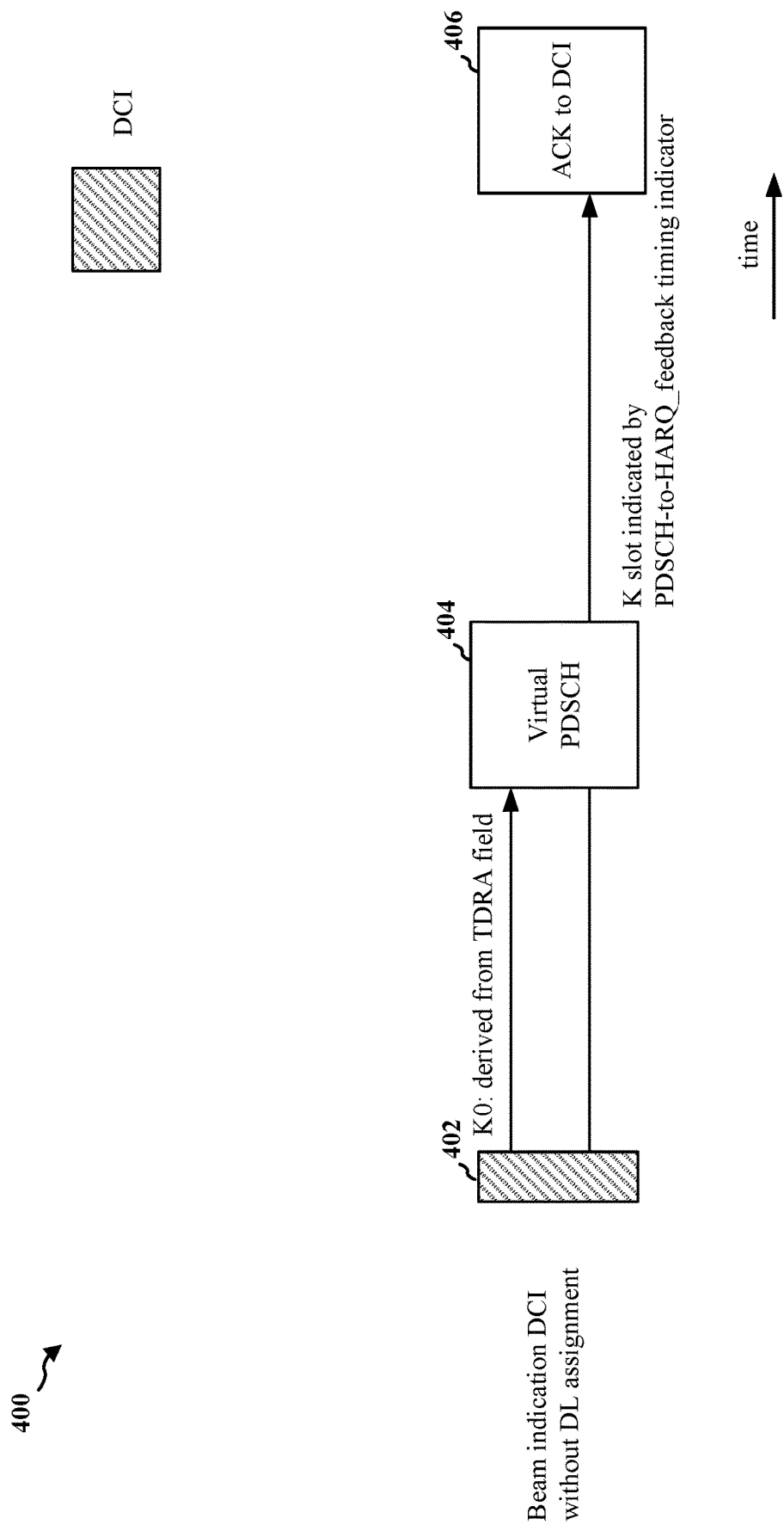
FIG. 4 is a diagram illustrating a DCI message that may not schedule a downlink transmission.

FIG. 4 is a diagram 400 illustrating a DCI message that may not schedule a downlink transmission. As shown, the network node may be configured to transmit a DCI message 402 that may not schedule any PDSCH communications. The DCI message 402 may indicate a TCI state (or a TCI state update). The UE may receive the DCI message 402 via a PDCCH or other suitable communications channel. The DCI message 402 may be in any suitable DCI message format, including without limitation DCI 1_1 or DCI 1_2. The TCI state indication (update) of the DCI message 402 may indicate to activate a new TCI state.

In some aspects, the DCI message 402 may not schedule any data transmissions along with indicating the TCI state. For example, the DCI message 402 may be provided by the network node to indicate to the UE the TCI state without scheduling any data transmissions. In this regard, the content of one or more fields of the DCI message 402 may indicate that the DCI message 402 is providing the TCI state without scheduling any data transmissions. For example, the cyclic redundancy check (CRC) of the DCI message 402 may be scrambled by a configured scheduling (CS)-radio network temporary identifier (RNTI) (CS-RNTI), and certain fields in the DCI message 402 may be set to certain values (e.g., redundancy version (RV)=all "1"s, modulation and coding scheme (MCS)=all "1"s, new data indicator (NDI)=0, frequency domain resource assignment (FDRA)=all "0"s (for FDRA type 0 or dynamicSwitch), or all "1"s (for FDRA type 1)) to indicate that the DCI message 402 is not scheduling a data transmission and/or the DCI message 402 is providing the TCI state. In other instances, the DCI message 402 may use other parameters and/or values to indicate that no data transmission is scheduled and/or that a TCI state is being provided. The TCI field in the DCI message 402 may indicate a TCI state ID associated with the TCI state being indicated.

In some aspects, when the DCI message 402 does not schedule a data communication, the UE may utilize the Type-1 HARQ-ACK codebook and/or the Type-2 HARQ-ACK codebook in a similar manner as to when a DCI message schedules one or more data communications. For example, if a UE provides HARQ-ACK information corresponding to detection of a DCI format that indicates a TCI state without scheduling a PDSCH communication reception, a location in the Type-1 HARQ-ACK codebook for the HARQ-ACK information may be the same as when the DCI format schedules a PDSCH reception with code block groups (CBGs) or with transport blocks that are correctly decoded. In this manner, when the DCI message 402 does not schedule a data communication, a virtual PDSCH 404 may be utilized to determine the resources utilized for the ACK/NACK associated with the DCI message 402. That is, a virtual PDSCH 404, which is not actually a scheduled DL communication, may be used to determine a location of an ACK 406 associated with a DCI message 402 that does not schedule a data communication. In this manner, the ACK 406 associated with the DCI message 402/virtual PDSCH 404 may be utilized to indicate to the network node that the UE successfully received the TCI state indicated by the DCI message 402 that does not otherwise schedule a data communication.

In some configurations, the DCI message 402 may include an indication of a location of the virtual PDSCH 404. In some aspects, the time domain resource assignment (TDRA) field of the DCI message 402 may be used to indicate a location of the virtual PDSCH 404. In some aspects, the UE may receive the DCI message 402 in a first slot and may transmit an ACK/NACK (e.g., ACK 406)

associated with the DCI message 402 in a second slot different from the first slot. The second slot may be offset from the first slot based on an offset indicator (e.g., k1). The offset indicator (k1) may be included in or indicated by the DCI message 402 or otherwise be known by the UE and/or network node. In some aspects, the location of the virtual PDSCH 404 may be based on the location of the ACK/NACK (e.g., ACK 406). In this regard, if the UE receives the DCI message 402 in the first slot and transmits the ACK/NACK (e.g., ACK 406) in a second slot based on an offset indicator (e.g., k1), then the virtual PDSCH 404 may be "scheduled" between the first slot and the second slot based on another offset indicator (e.g., k0) relative to the first slot. In some instances, the offset indicator associated with the virtual PDSCH 404 may be equal to 0 such that the virtual PDSCH 404 is "scheduled" in the slot immediately following the slot in which the DCI message 402 is transmitted. In other instances, the slot associated with the virtual PDSCH 404 may be offset from the first slot of the DCI message 402 by one or more additional slots. In some instances, the difference between the offset (e.g., k1) associated with the ACK/NACK (e.g., ACK 406) and the offset associated with the virtual PDSCH 404 (e.g., k0) may be among the set of available offset slot timing values (e.g., k1) associated with the ACK/NACK (e.g., ACK 406). The set of available slot timing values (e.g., k1) may be provided to the UE in an RRC list or other suitable communication. In some instances, the TDRA field may indicate a value of an offset (e.g., k0) that may represent the offset between the DCI message 402 to the virtual PDSCH 404. The "PDSCH-to-HARQ-feedback" timing indicator in the DCI message 402 may indicate a value of a time offset (e.g., k1) from the DCI message 402 to the ACK/NACK (e.g., ACK 406) in the PUCCH. In some instances, the difference between k1 and k0, e.g., (k1–k0), may be a proper value of an offset between a "scheduled" virtual PDSCH and an associated ACK.

In some configurations, multiple TRPs (e.g., associated with a network node) may be deployed to improve spatial diversity (e.g., for mmW signal reception). In some configurations, a network node may be associated with 2 TRPs.

In some configurations, the multi-TRP operation may be multi-DCI based. For the multi-DCI based multi-TRP operation, ach TRP may be associated with a CORESET pool. Each TRP may send its respective PDCCH using the CORESET associated with the TRP to schedule communications from that TRP. In other words, the DCI message from one TRP may schedule communications from the same TRP. Further, the TCI states may be associated with the individual TRP/the respective CORESET pool.

In some configurations, the multi-TRP operation may be single DCI-based. In other words, a single DCI message may indicate TCI states and/or schedule transmissions for the multiple TRPs. Assuming there are two TRPs, when the TCI states are activated via the MAC-CE, the MAC-CE may map a pair of TCI states to each TCI state codepoint (or simply, codepoint), where each TCI state in the pair of TCI states may correspond to a respective one of the two TRPs. Accordingly, a DCI message may indicate a codepoint index for a communication assignment. The pair of beams corresponding to the pair of TCI states mapped to the indicated codepoint may be used for the communication, where each beam in the pair of beams may be from the respective one of the two TRPs. In different configurations, for the single-DCI based multi-TRP operation, the CORESET pool may or may not be configured. Further, the UE may or may not know the association between the TRP and the TCI states.

FIG. 5 is a diagram of an example MAC-CE 500 associated with activating unified TCI states for single TRP operation. As described above, in some configurations, an activated unified TCI state codepoint may include up to 2 TCI states. In particular, an activated unified TCI state codepoint may include: 1) a pair of DL TCI state and UL TCI state, 2) a single joint DL/UL TCI state, or 3) a single DL TCI state or a single UL TCI state.

As shown in FIG. 5, the MAC-CE 500 may activate a number (N) of TCI states, each of which may be associated with a TCI state ID 506. The $P_i$ (i (index)=1, 2, . . . , N'; in FIG. 5, N'=8) field 502 may indicate whether the corresponding TCI state codepoint has multiple TCI states or a single TCI state. For example, a $P_i$, e.g., 502 set to "1" may indicate that the i-th TCI codepoint may include both the DL TCI state and the UL TCI state. On the other hand, a $P_i$, e.g., 502 set to "0" may indicate that the i-th TCI state codepoint may include a single TCI state (e.g., a joint TCI state, a DL TCI state or a UL TCI state, but not both a DL TCI state and a UL TCI state). With $P_i$, e.g., 502, the association between the TCI state IDs 506 and the codepoints may be ascertained based on the sequence of the TCI state IDs 506. For example, if $P_1$ is set to "1" and $P_2$ is set to "0", then the 1st codepoint may be associated with the TCI state ID 1 and the TCI state ID 2, and the 2nd codepoint may be associated with the TCI state ID 3.

Further, as shown, each TCI state ID 506 may be associated with a D/L (DL/UL) field 504. The D/L field 504 may indicate the type of the associated TCI state (corresponding to the associated TCI state ID 506), that is, whether the associated TCI state ID 506 (e.g., in the same octet) is for a joint/DL TCI state or a UL TCI state. For example, if a D/L field 504 is set to "1", the associated TCI state ID 506 may be for a joint/DL TCI state. On the other hand, if a D/L field 504 is set to "0", the associated TCI state ID 506 may be for a UL TCI state.

In one or more aspects, with adaptations, the unified TCI state framework may be extended to the multi-TRP use case. In particular, the MAC-CE as well as the DCI message may be adapted for the multi-TRP use case. For the single-DCI based multi-TRP operation, assuming there are M TRPs, each codepoint may include TCI states for all M TRPs (or a subset thereof), where each TCI state in the codepoint may be associated with one or more TRPs in the M TRPs. The MAC-CE and the DCI message may be adapted so that they may work with such codepoints. Herein TCI states within a codepoint that correspond to a particular TRP in the M TRPs may be referred to, collectively, as the sub-codepoint associated with that TRP. Therefore, each codepoint may include up to M sub-codepoints.

In one or more configurations, each of the M sub-codepoints may include up to N TCI states. In one configuration, N may be equal to 2 (e.g., a pair of UL TCI state and DL TCI state) (i.e., the same as the scenario for the single TRP case described above). In further configurations and in general, N may be greater than 2. For example, each TRP may be associated with more than one DL TCI state (e.g., there may be one DL TCI state for the PDSCH and another DL TCI state for the PDCCH). In some configurations, the multi-TRP operation may involve 2 TRPs (i.e., M=2).

In some configurations, the MAC-CE may activate multiple lists of TCI states (which may also be referred to as lists of codepoints or codepoint lists), where each list may be associated with a respective TRP. In one example, each TRP in the multiple TRPs may be associated with a respective TCI state position in the codepoint (e.g., a particular TRP may be associated with the second TCI state in the codepoint). Further, the DCI message may include separate indication(s) (e.g., different bits/fields) to indicate the TCI states for each of the multiple TRPs. Accordingly, changes to the TCI state activation via MAC-CE may be kept to a minimum. However, the DCI message may be adapted to include the additional indications (bits/fields).

In some other configurations, the MAC-CE may activate a single TCI state list (codepoint list). Further, each activated codepoint may include the TCI states associated with all M TRPs (or a subset thereof). Accordingly, a new format for the MAC-CE may be used for the TCI state activation.

In configurations where multiple lists of TCI states (codepoints) are activated, one or multiple MAC-CEs may be used to activate the multiple lists of TCI states (codepoints). Each TCI state list (codepoint list) may correspond to a respective TRP in the multiple TRPs. As described above, a particular TRP may be associated with a respective CORESET pool, a respective TCI state position in the codepoint, or a respective sub-codepoint, etc. Accordingly, for example, in the multiple TCI state lists (codepoint lists), the m-th list may correspond to the m-th TCI state in the codepoint or the m-th sub-codepoint. The m-th TCI state in the codepoint or the m-th sub-codepoint may correspond to the m-th TRP in the multiple TRPs. Further, as described above in an example, for each codepoint, each TRP may be associated with a pair of DL TCI state and UL TCI state. The pair of TCI states may be referred to, collectively, as the sub-codepoint associated with the TRP. Accordingly, a codepoint may include all sub-codepoints associated with all the multiple TRPs.

In some configurations, a TCI state list (codepoint list) may include a list of TCI state IDs/sub-codepoint IDs. Further, a DCI message may indicate one of the TCI state IDs or one of the sub-codepoints. In a further configuration, a reserved TCI state index (TCI state ID) may be used to indicate that no TCI state from the current list is indicated. In other words, the TRP corresponding to the current list may not contribute to the communication if a codepoint including the reserved TCI state ID is indicated.

In some configurations, if multiple lists of TCI states (codepoints) are activated, the DCI message may include multiple TCI state fields, where each of the TCI state fields may indicate a TCI state (a sub-codepoint) from the corresponding TCI state list (codepoint list). In some other configurations, instead of multiple TCI state fields, the DCI message may include a single TCI state field that may in turn include multiple TCI state subfields, where each of the TCI state subfields may correspond to a respective TCI state list (codepoint list).

Figure 6:
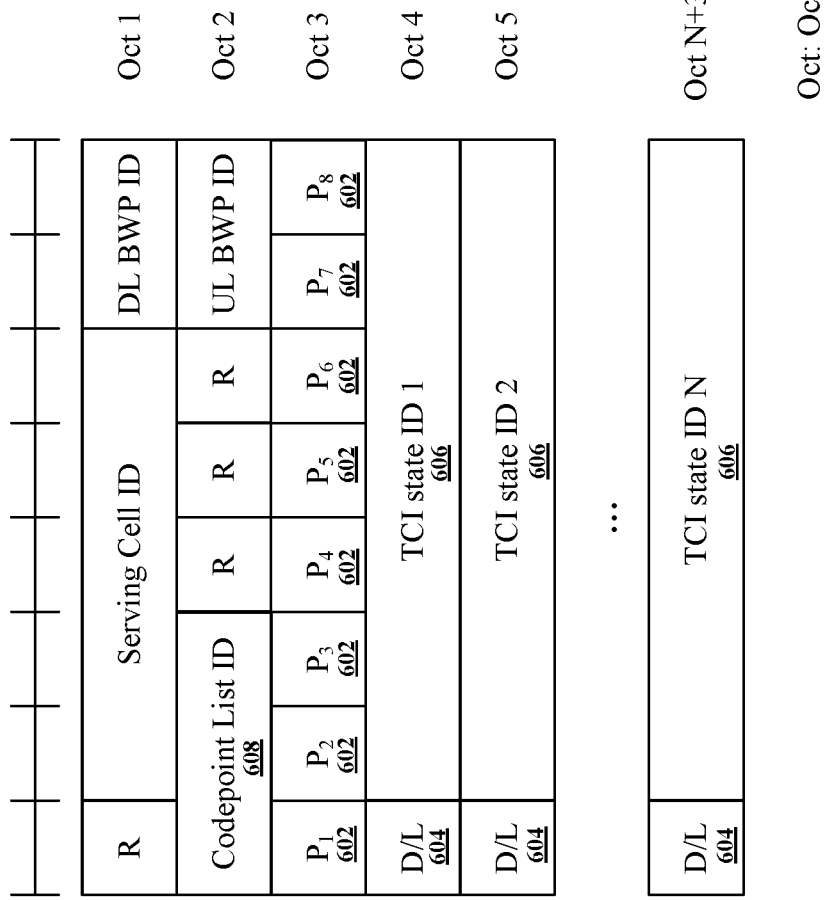
FIG. 6 is a diagram of an example MAC-CE associated with activating unified TCI states for multi-TRP operation, according to one or more aspects of the disclosure.

FIG. 6 is a diagram of an example MAC-CE 600 associated with activating unified TCI states for multi-TRP operation, according to one or more aspects of the disclosure. The MAC-CE 600 may be one of the MAC-CEs that may activate multiple codepoint lists (TCI state lists) for the multi-TRP operation. The codepoint list activated via the MAC-CE 600 may correspond to one particular TRP in the multiple TRPs. The $P_i$, e.g., 602, the D/L field 604, and the TCI state ID 606 may be similar to the $P_i$, e.g., 502, the D/L field 504, and the TCI state ID 506 in FIG. 5. Further, as shown, the MAC-CE 600 may include a codepoint list ID field 608. In some configurations, the associated TRP ID or CORESET pool ID may be used as the codepoint list ID for the MAC-CE 600. Accordingly, as described above, the m-th codepoint list may correspond to the m-th TRP in the multiple TRPs or the m-th sub-codepoint.

In some configurations, as shown in FIG. 6, to activate multiple codepoint lists, a codepoint list ID may be assigned to each MAC-CE of the multiple MAC-CEs for activating the TCI states. Accordingly, each MAC-CE for activating TCI states may be associated with a codepoint list ID, and may activate a corresponding codepoint list (TCI state list).

In some configurations, a single MAC-CE for activating multiple codepoint lists may be used, where the single MAC-CE may include multiple MAC-CE parts, and each MAC-CE part may include a codepoint list ID field, may be associated with a respective codepoint list ID, and may activate a corresponding codepoint list (TCI state list).

In some configurations, the MAC-CE may activate a single codepoint list for multi-TRP operation. Each codepoint in the single codepoint list may include the TCI states for all the multiple TRPs (or a subset thereof). Accordingly, the DCI message indicating the TCI states may include a TCI state field that may indicate a codepoint in the single codepoint list based on a codepoint index. However, to activate the TCI states for the multiple TRPs with a single codepoint list, the MAC-CE may be adapted to accommodate the increased number of TCI states in each codepoint. In particular, for example, for the single TRP operation, it may be sufficient for each codepoint to include up to 2 TCI states for the single TRP, as described above. However, for the multi-TRP operation, each codepoint may include more TCI states. For example, if there are 2 TRPs, each codepoint may include up to 4 TCI states for the 2 TRPs: Each TRP may be associated with up to 2 (i.e., 0, 1, or 2) TCI states.

In some configurations, the MAC-CE for activating the single codepoint list for multi-TRP operation may include multiple MAC-CE parts, where each MAC-CE part may activate the TCI states for a corresponding one of the multiple TRPs. In other words, the number of MAC-CE parts may be equal to the number of TRPs. Accordingly, the MAC-CE for activating the codepoint list may be a concatenation of the multiple MAC-CE parts. Further, each MAC-CE part may be associated with the corresponding TRP ID. Therefore, the i-th codepoint may include all the i-th sub-codepoints for the multiple TRPs.

In some additional configurations, the MAC-CE for activating the single codepoint list for multi-TRP operation may include a list of codepoints. Additional indications (bits/fields) in the MAC-CE may indicate the number of TCI states in each of the codepoints and the particular TRPs with which the TCI states are associated. Further still, the MAC-CE may include additional indications (bits) to indicate the type of each TCI state (e.g., joint/DL or UL).

Figure 7:
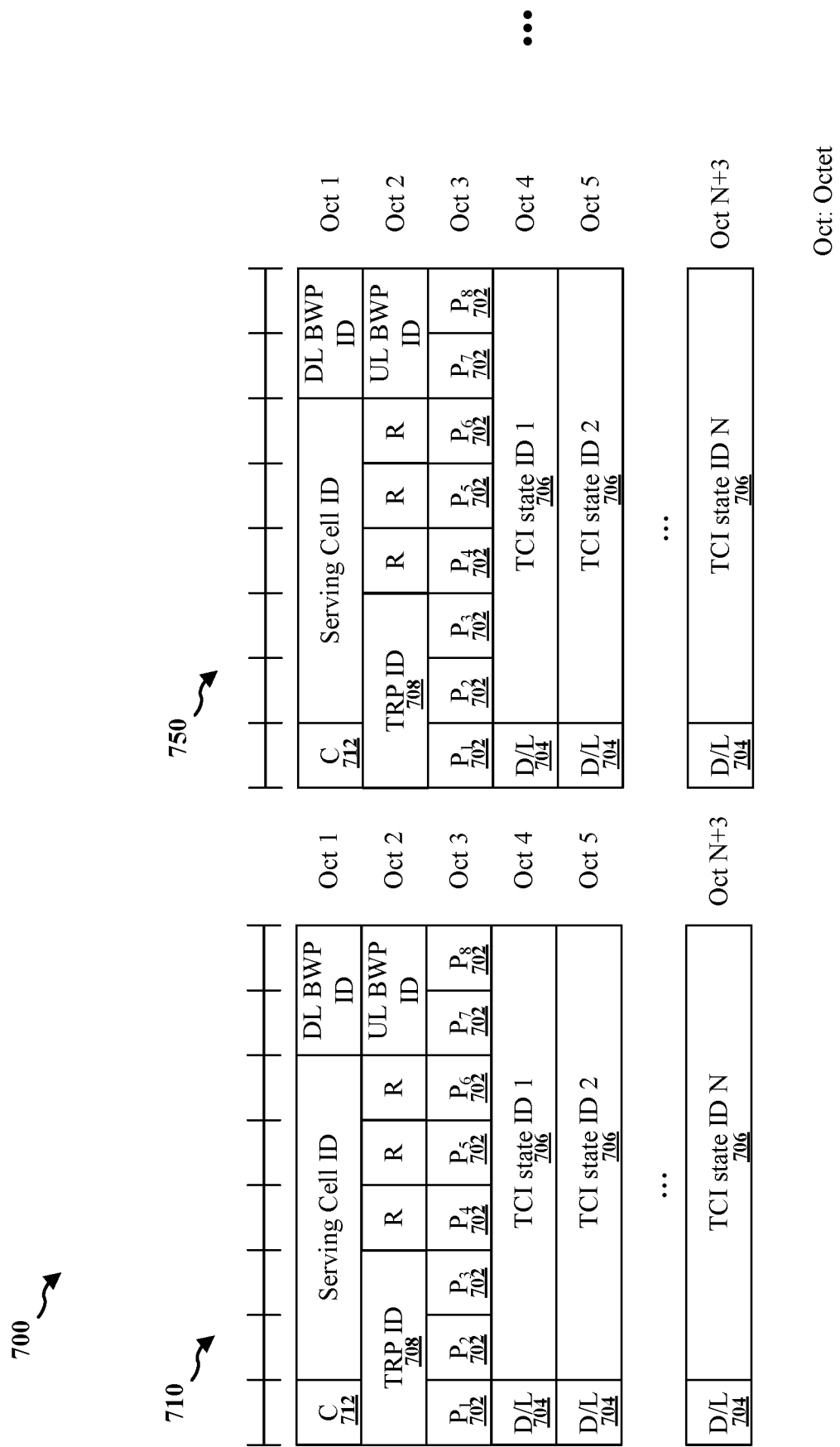
FIG. 7 is a diagram of example MAC-CE parts associated with activating unified TCI states for multi-TRP operation, according to one or more aspects of the disclosure.

FIG. 7 is a diagram 700 of example MAC-CE parts associated with activating unified TCI states for multi-TRP operation, according to one or more aspects of the disclosure. The MAC-CE parts 710 and 750, as shown, may be two of the MAC-CE parts of a MAC-CE that may activate a single codepoint list for the multi-TRP operation. As described above, each of the MAC-CE parts (e.g., MAC-CE parts 710 and 750) may correspond to a respective TRP (which may correspond to a respective CORESET pool or a respective beam group). Accordingly, the respective TRP ID 708 may be used as the ID of the corresponding MAC-CE part. Further, as shown, each MAC-CE part may indicate a (serving) cell ID and one or more bandwidth part (BWP) IDs (e.g., DL BWP IP and UL BWP ID). Moreover, as each of the MAC-CE parts may correspond to a respective TRP, each of the MAC-CE parts may activate a respective sub-codepoint corresponding to the respective TRP. The $P_j$ 702, the D/L field 704, and the TCI state ID 706 may be similar to the $P_i$, e.g., 502, the D/L field 504, and the TCI state ID 506 in FIG. 5. In some configurations, each MAC-CE part (e.g., MAC-CE parts 710 and 750) may include a field (e.g., a "C" bit 712) that may indicate whether the MAC-CE part is the last MAC-CE part (i.e., whether there is another MAC-CE part to follow). In some configurations, the MAC-CE may include a field that may indicate the total number of MAC-CE parts in the MAC-CE. Furthermore, in some configurations, a reserved TCI state index (e.g., a TCI state ID 706) may be used to indicate that no TCI state is indicated for the corresponding TRP for the codepoint (i.e., the TRP may not participate in the associated communication if the codepoint is indicated). Therefore, as shown, the i-th codepoint may include all the i-th sub-codepoints for the multiple TRPs.

Figure 8:
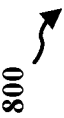
FIG. 8 is a diagram of an example MAC-CE associated with activating unified TCI states for multi-TRP operation, according to one or more aspects of the disclosure.

FIG. 8 is a diagram of an example MAC-CE 800 associated with activating unified TCI states for multi-TRP operation, according to one or more aspects of the disclosure. As shown, the MAC-CE 800 may include a list of codepoints. Additional indications may be used to indicate the association between TRPs and TCI states within each codepoint. Accordingly, the association between TCI states and TRPs may be used for per-TRP beam failure recovery (BFR) and/or beam reset.

In FIG. 8, the D/L field 804 and the TCI state ID 806 may be similar to the D/L field 504 and the TCI state ID 506 in FIG. 5. Further, as shown, each TCI state ID 806 may be associated with a TRP ID 808 (which may correspond to a CORESET pool ID). Therefore, the MAC-CE 800 may indicate the association between TCI states and TRPs. Furthermore, the MAC-CE 800 may include $Q_i$ fields 802, which may indicate the number of TCI states associated with the corresponding codepoint. Each of $Q_i$ 802 may include multiple bits because each codepoint may include more than 2 TCI states. For example, if there are 2 TRPs and each TRP may be associated with up to 2 TCI states, each codepoint may include up to 4 TCI states, and as a result, each of $Q_i$ 802 may include 2 bits. It should be appreciated that the length (number of bits) of each of $Q_i$ 802 may be determined based on the maximum possible number of TCI states in each codepoint. For example, if there are up to M TRPs and up to N TCI states associated with each of the M TRPs, the maximum possible number of TCI states in each codepoint may be M*N, and the length of each of $Q_i$ 802 may be determined based on $\log_2 M*N$.

Figure 9:
FIG. 9 is a diagram of an example MAC-CE associated with activating unified TCI states for multi-TRP operation, according to one or more aspects of the disclosure.

FIG. 9 is a diagram of an example MAC-CE 900 associated with activating unified TCI states for multi-TRP operation, according to one or more aspects of the disclosure. As shown, the MAC-CE 900 may include a list of codepoints. The D/L field 904 and the TCI state ID 906 may be similar to the D/L field 504 and the TCI state ID 506 in FIG. 5. Additional indications may be used to indicate the association between TRPs and TCI states within each codepoint. Accordingly, the $Q_{i,j}$ field 902 may indicate the number of TCI states in the codepoint list that are associated with the i-th codepoint and the j-th TRP (j-th CORESET pool). With $Q_{i,j}$ 902, the association between the TCI state IDs 906 and the codepoints may be ascertained based on the sequence of the TCI state IDs 906. For example, if $Q_{1,1}$ indicates 2 TCI states and $Q_{1,2}$ indicates 1 TCI state, then the 1st codepoint may be associated with the TCI state ID 1, the TCI state ID 2, and the TCI state ID 3, where the TCI state ID 1 and the TCI state ID 2 may be associated with the 1st TRP and the TCI state ID 3 may be associated with the 2nd TRP. Compared to the MAC-CE 800, the MAC-CE 900 may not include a TRP ID for each of the TCI state ID 906. In some configurations, if each TRP is associated with up to 2 (i.e., 0, 1, or 2) TCI states, each of $Q_{i,j}$ 902 may include 2 bits.

Figure 10:
FIG. 10 is a diagram of an example MAC-CE associated with activating unified TCI states for multi-TRP operation, according to one or more aspects of the disclosure.

FIG. 10 is a diagram of an example MAC-CE 1000 associated with activating unified TCI states for multi-TRP operation, according to one or more aspects of the disclosure. As an example, the MAC-CE 1000 may be used to activate the unified TCI states if there are at most 2 TCI states associated with each TRP in a codepoint. The $Q_{i,j}$ field 902 and the D/L field 904 of FIG. 9 may be combined into a joint $Q_{i,j}$ field 1002. Each of $Q_{i,j}$ 1002 may indicate the number of TCI states in the codepoint list that are associated with the i-th codepoint and the j-th TRP, as well as the types of these TCI states (e.g., joint/DL or UL). In a non-limiting example, each of $Q_{i,j}$ 1002 may include 2 bits. For example, a $Q_{i,j}$ 1002 value of "00" may indicate that no TCI state is associated with the i-th codepoint for the j-th TRP. Further, a $Q_{i,j}$ 1002 value of "11" may indicate 2 TCI states are associated with the i-th codepoint for the j-th TRP and the types of the 2 TCI states are "joint/DL" and "UL," respectively (using the order in the list of TCI state IDs 1006: the first TCI state is a joint/DL TCI state and the second TCI state is a UL TCI state). Moreover, a $Q_{i,j}$ 1002 value of "01" may indicate one TCI state is associated with the i-th codepoint for the j-th TRP and the type of the TCI state is "joint/DL." In addition, a $Q_{i,j}$ 1002 value of "10" may indicate one TCI state is associated with the i-th codepoint for the j-th TRP and the type of the TCI state is "UL." Therefore, compared to the MAC-CE 900, the MAC-CE 1000 may not include the D/L field 904 for each TCI state ID 1006.

In some configurations, if the codepoint list includes a single TCI state (a single sub-codepoint/a single codepoint), the single TCI state (sub-codepoint/codepoint) may automatically be considered active without further DCI indication. For example, the TCI state may be active automatically 3 ms after the ACK associated with the MAC-CE activating the codepoint list is sent.

Figure 11:
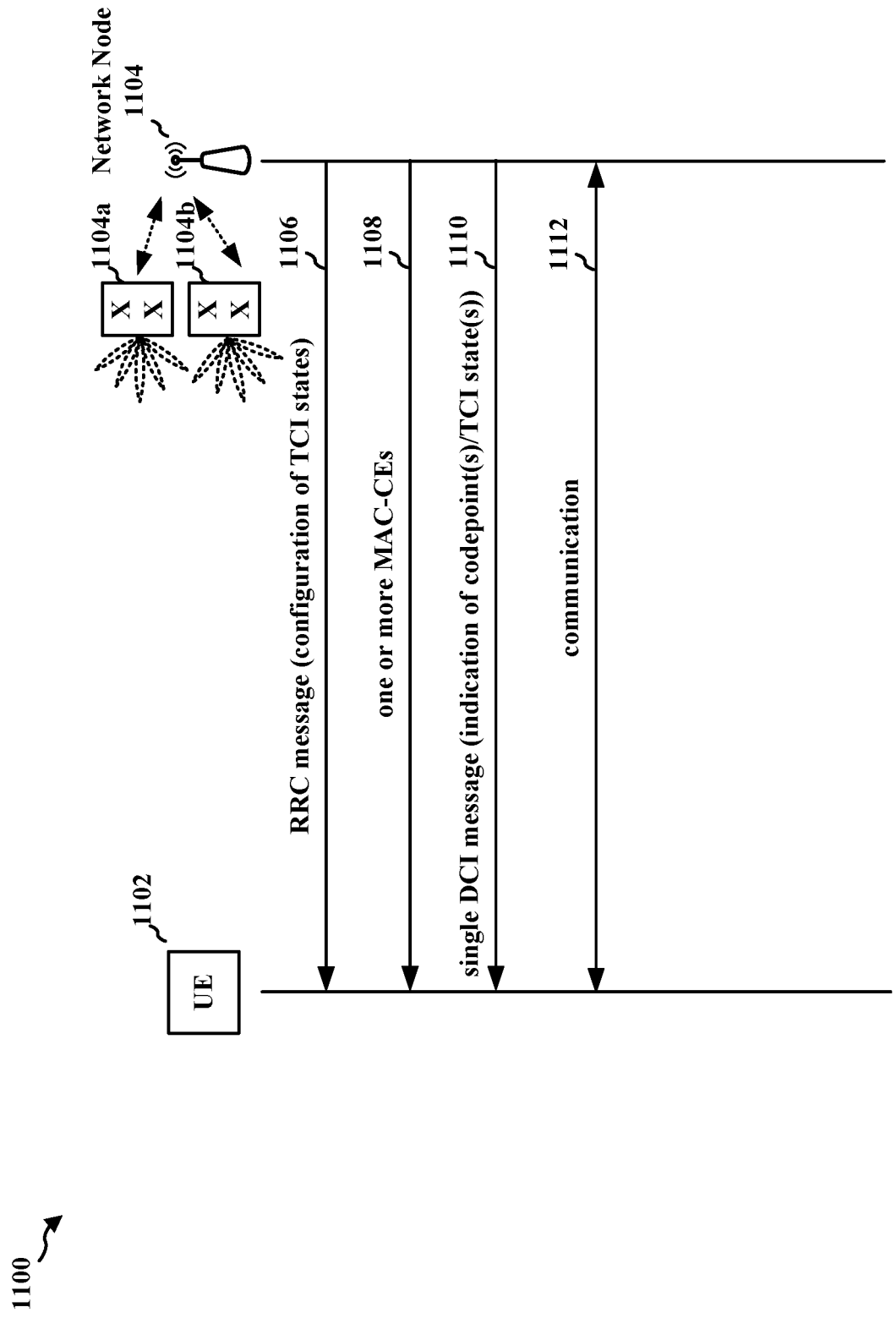
FIG. 11 is a diagram of a communication flow of a method of wireless communication.

FIG. 11 is a diagram of a communication flow 1100 of a method of wireless communication. The UE 1102 may correspond to the UE 104/350. The network node 1104 may correspond to the base station/network node 102/310. The network node 1104 may include a plurality of TRPs (e.g., TRPs 1104a and 1104b). At 1106, the network node 1104 may transmit an RRC message to the UE 1102. The RRC message may include a configuration of a plurality of TCI states. Each TCI state in the plurality of TCI states may be associated with a respective TCI state ID.

At 1108, the network node 1104 may transmit one or more MAC-CEs to the UE 1102. The one or more MAC-CEs may include a configuration of a plurality of codepoints. Each codepoint in the plurality of codepoints may be associated with one or more TRPs in the plurality of TRPs (e.g., the TRPs 1104a and 1104b) of the network node 1104. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication.

At 1110, the network node 1104 may transmit a single DCI message to the UE 1102. The single DCI message may be indicative of at least one codepoint in the plurality of codepoints.

In one configuration, each TRP in the plurality of TRPs may be associated with a CORESET pool or a beam group.

In one configuration, the single DCI message at 1110 may further be indicative of at least one TCI state associated with the at least one codepoint.

In one configuration, the configuration of the plurality of codepoints may include a plurality of codepoint lists. Each codepoint list in the plurality of codepoint lists may correspond to a respective TRP in the plurality of TRPs.

In one configuration, each codepoint list in the plurality of codepoint lists may be associated with a codepoint list ID.

In one configuration, each codepoint in the plurality of codepoints may be associated with a single TRP in the plurality of TRPs.

In one configuration, the single DCI message at 1110 may include a plurality of indications associated with the at least one codepoint. The at least one codepoint may include a respective codepoint for each TRP in the plurality of TRPs. Each indication in the plurality of indications may be associated with a respective TRP in the plurality of TRPs.

In one configuration, the one or more MAC-CEs at 1108 may include a plurality of MAC-CEs. Each MAC-CE in the plurality of MAC-CEs may include a respective codepoint list in the plurality of codepoint lists.

In one configuration, the one or more MAC-CEs at 1108 may include a single MAC-CE. The single MAC-CE may include a plurality of MAC-CE parts. Each MAC-CE part in the plurality of MAC-CE parts may include a respective codepoint list in the plurality of codepoint lists.

In one configuration, the one or more MAC-CEs at 1108 may include a single MAC-CE. The configuration of the plurality of codepoints may include a single codepoint list corresponding to all TRPs in the plurality of TRPs. Each codepoint in the plurality of codepoints may be associated with all TRPs in the plurality of TRPs.

In one configuration, the at least one codepoint may include a single codepoint.

In one configuration, the single MAC-CE may include a plurality of MAC-CE parts. Each MAC-CE part in the plurality of MAC-CE parts may be associated with a respective TRP in the plurality of TRPs.

In one configuration, each MAC-CE part in the plurality of MAC-CE parts may include an indication of whether the MAC-CE part is a last MAC-CE part.

In one configuration, the single MAC-CE may include an indication of a number of the plurality of MAC-CE parts.

In one configuration, the single MAC-CE may indicate, for each codepoint in the plurality of codepoints, a number of TCI states included in the codepoint. The single MAC-CE may indicate, for each TCI state included in the plurality of codepoints, one or more TRPs associated with the TCI state.

In one configuration, the single MAC-CE may further indicate, for each TCI state included in the plurality of codepoints, a type of the TCI state.

In one configuration, the single MAC-CE may include, for each codepoint in the plurality of codepoints, an indication of the number of TCI states included in the codepoint. The single MAC-CE includes, for each TCI state included in the plurality of codepoints, one or more TRP IDs associated with the one or more TRPs associated with the TCI state.

In one configuration, the single MAC-CE may include, for each TRP in the plurality of TRPs associated with each codepoint in the plurality of codepoints, an indication of a number of TCI states included in the codepoint for the TRP.

In one configuration, the single MAC-CE may include, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP.

In one configuration, each TRP in the plurality of TRPs may be associated with, in each codepoint in the plurality of codepoints, two or fewer TCI states. The joint indication may include 2 bits.

At 1112, the UE 1102 and the network node 1104 may communicate with each other based on the at least one codepoint.

Figure 12:
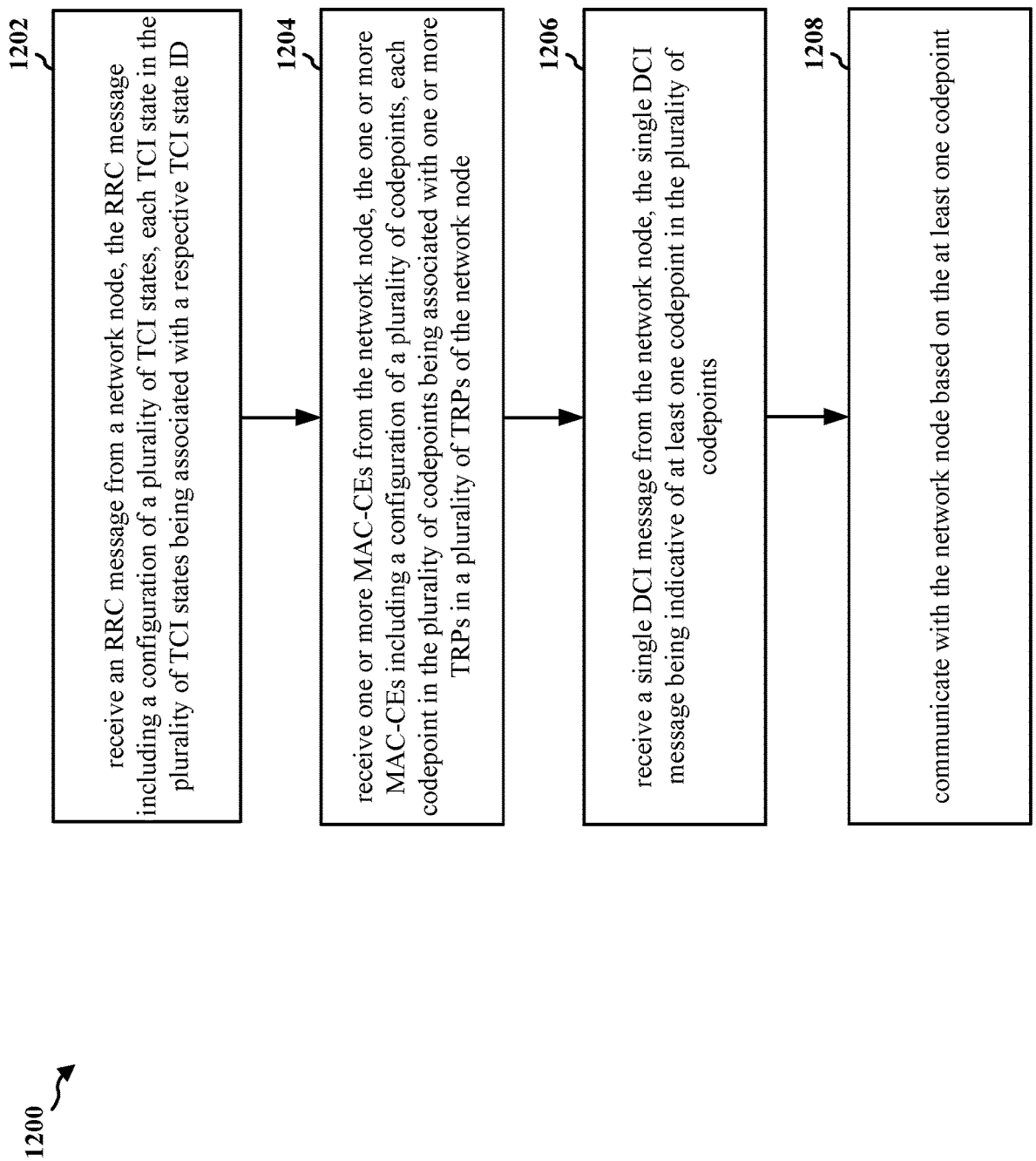
FIG. 12 is a flowchart of a method of wireless communication.

FIG. 12 is a flowchart 1200 of a method of wireless communication. The method may be performed by a UE (e.g., the UE 104/350; the UE 1102; the apparatus 1404). At 1202, the UE may receive an RRC message from a network node. The RRC message may include a configuration of a plurality of TCI states. Each TCI state in the plurality of TCI states may be associated with a respective TCI state ID. For example, 1202 may be performed by the component 198 in FIG. 14. Referring to FIG. 11, at 1106, the UE 1102 may receive an RRC message from a network node 1104.

At 1204, the UE may receive one or more MAC-CEs from the network node. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. For example, 1204 may be performed by the component 198 in FIG. 14. Referring to FIG. 11, at 1108, the UE 1102 may receive one or more MAC-CEs from the network node 1104.

At 1206, the UE may receive a single DCI message from the network node. The single DCI message may be indicative of at least one codepoint in the plurality of codepoints. For example, 1206 may be performed by the component 198 in FIG. 14. Referring to FIG. 11, at 1110, the UE 1102 may receive a single DCI message from the network node 1104.

At 1208, the UE may communicate with the network node based on the at least one codepoint. For example, 1208 may be performed by the component 198 in FIG. 14. Referring to FIG. 11, at 1112, the UE 1102 may communicate with the network node 1104 based on the at least one codepoint.

In one configuration, each TRP in the plurality of TRPs may be associated with a CORESET pool or a beam group.

In one configuration, referring to FIG. 11, the single DCI message at 1110 may further be indicative of at least one TCI state associated with the at least one codepoint.

In one configuration, the configuration of the plurality of codepoints may include a plurality of codepoint lists. Each codepoint list in the plurality of codepoint lists may correspond to a respective TRP in the plurality of TRPs.

In one configuration, each codepoint list in the plurality of codepoint lists may be associated with a codepoint list ID.

In one configuration, each codepoint in the plurality of codepoints may be associated with a single TRP in the plurality of TRPs.

In one configuration, referring to FIG. 11, the single DCI message at 1110 may include a plurality of indications associated with the at least one codepoint. The at least one codepoint may include a respective codepoint for each TRP in the plurality of TRPs. Each indication in the plurality of indications may be associated with a respective TRP in the plurality of TRPs.

In one configuration, referring to FIG. 11, the one or more MAC-CEs at 1108 may include a plurality of MAC-CEs. Each MAC-CE in the plurality of MAC-CEs may include a respective codepoint list in the plurality of codepoint lists.

In one configuration, referring to FIG. 11, the one or more MAC-CEs at 1108 may include a single MAC-CE. The single MAC-CE may include a plurality of MAC-CE parts. Each MAC-CE part in the plurality of MAC-CE parts may include a respective codepoint list in the plurality of codepoint lists.

In one configuration, referring to FIG. 11, the one or more MAC-CEs at 1108 may include a single MAC-CE. The configuration of the plurality of codepoints may include a single codepoint list corresponding to all TRPs in the plurality of TRPs. Each codepoint in the plurality of codepoints may be associated with all TRPs in the plurality of TRPs.

In one configuration, the at least one codepoint may include a single codepoint.

In one configuration, the single MAC-CE may include a plurality of MAC-CE parts. Each MAC-CE part in the plurality of MAC-CE parts may be associated with a respective TRP in the plurality of TRPs.

In one configuration, each MAC-CE part in the plurality of MAC-CE parts may include an indication of whether the MAC-CE part is a last MAC-CE part.

In one configuration, the single MAC-CE may include an indication of a number of the plurality of MAC-CE parts.

In one configuration, the single MAC-CE may indicate, for each codepoint in the plurality of codepoints, a number of TCI states included in the codepoint. The single MAC-CE may indicate, for each TCI state included in the plurality of codepoints, one or more TRPs associated with the TCI state.

In one configuration, the single MAC-CE may further indicate, for each TCI state included in the plurality of codepoints, a type of the TCI state.

In one configuration, the single MAC-CE may include, for each codepoint in the plurality of codepoints, an indication of the number of TCI states included in the codepoint. The single MAC-CE includes, for each TCI state included in the plurality of codepoints, one or more TRP IDs associated with the one or more TRPs associated with the TCI state.

In one configuration, the single MAC-CE may include, for each TRP in the plurality of TRPs associated with each codepoint in the plurality of codepoints, an indication of a number of TCI states included in the codepoint for the TRP.

In one configuration, the single MAC-CE may include, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP.

In one configuration, each TRP in the plurality of TRPs may be associated with, in each codepoint in the plurality of codepoints, two or fewer TCI states. The joint indication may include 2 bits.

Figure 13:
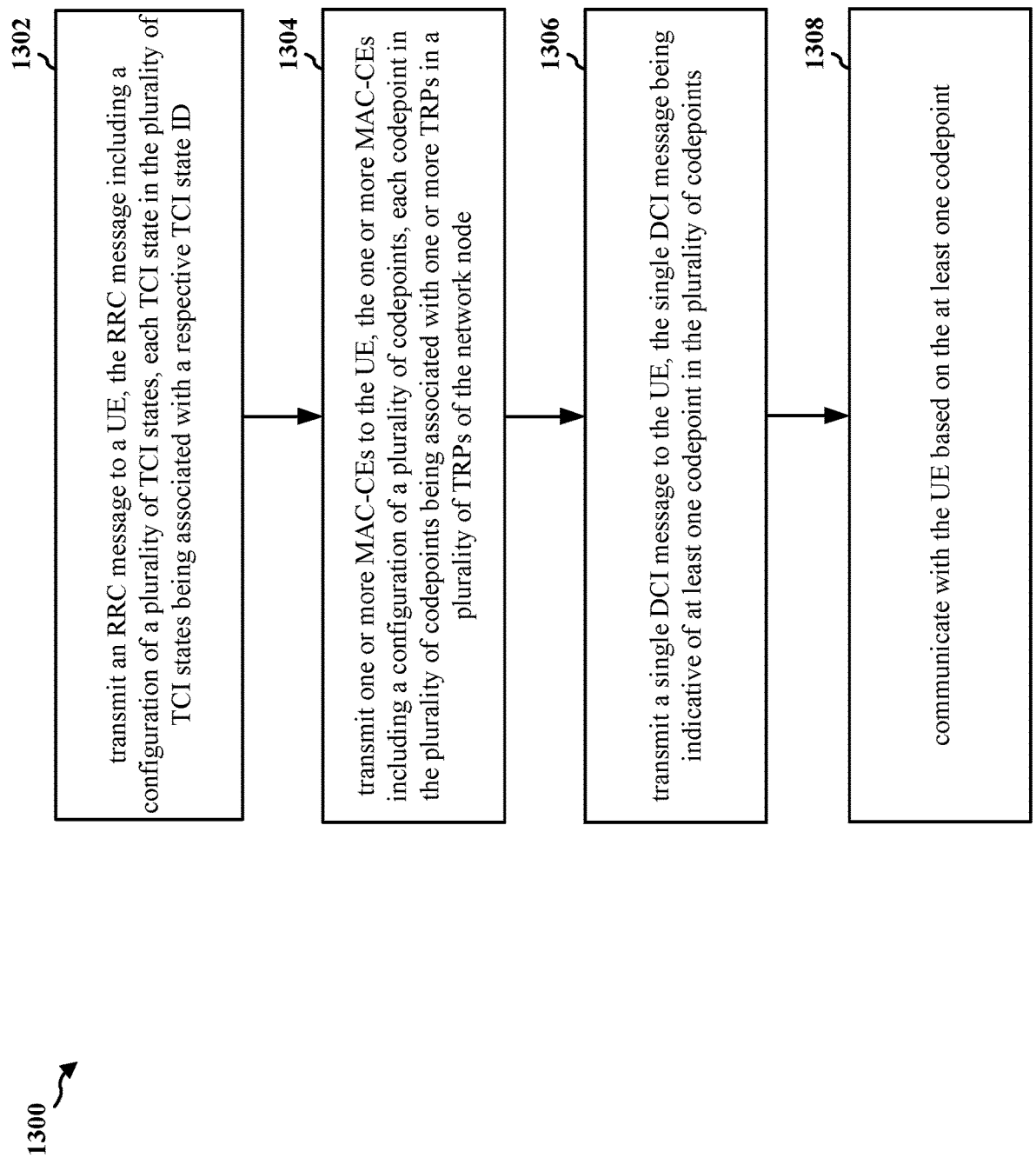
FIG. 13 is a flowchart of a method of wireless communication.

FIG. 13 is a flowchart 1300 of a method of wireless communication. The method may be performed by a base station/network node (e.g., the base station 102/310; the network node 1104; the network entity 1402). At 1302, the network node may transmit an RRC message to a UE. The RRC message may include a configuration of a plurality of TCI states. Each TCI state in the plurality of TCI states may be associated with a respective TCI state ID. For example, 1302 may be performed by the component 199 in FIG. 15. Referring to FIG. 11, at 1106, the network node 1104 may transmit an RRC message to a UE 1102.

At 1304, the network node may transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. For example, 1304 may be performed by the component 199 in FIG. 15. Referring to FIG. 11, at 1108, the network node 1104 may transmit one or more MAC-CEs to the UE 1102.

At 1306, the network node may transmit a single DCI message to the UE. The single DCI message may be indicative of at least one codepoint in the plurality of codepoints. For example, 1306 may be performed by the component 199 in FIG. 15. Referring to FIG. 11, at 1110, the network node 1104 may transmit a single DCI message to the UE 1102.

At 1308, the network node may communicate with the UE based on the at least one codepoint. For example, 1308 may be performed by the component 199 in FIG. 15. Referring to FIG. 11, at 1112, the network node 1104 may communicate with the UE 1102 based on the at least one codepoint.

In one configuration, each TRP in the plurality of TRPs may be associated with a CORESET pool or a beam group.

In one configuration, referring to FIG. 11, the single DCI message at 1110 may further be indicative of at least one TCI state associated with the at least one codepoint.

In one configuration, the configuration of the plurality of codepoints may include a plurality of codepoint lists. Each codepoint list in the plurality of codepoint lists may correspond to a respective TRP in the plurality of TRPs.

In one configuration, each codepoint list in the plurality of codepoint lists may be associated with a codepoint list ID.

In one configuration, each codepoint in the plurality of codepoints may be associated with a single TRP in the plurality of TRPs.

In one configuration, referring to FIG. 11, the single DCI message at 1110 may include a plurality of indications associated with the at least one codepoint. The at least one codepoint may include a respective codepoint for each TRP in the plurality of TRPs. Each indication in the plurality of indications may be associated with a respective TRP in the plurality of TRPs.

In one configuration, referring to FIG. 11, the one or more MAC-CEs at 1108 may include a plurality of MAC-CEs. Each MAC-CE in the plurality of MAC-CEs may include a respective codepoint list in the plurality of codepoint lists.

In one configuration, referring to FIG. 11, the one or more MAC-CEs at 1108 may include a single MAC-CE. The single MAC-CE may include a plurality of MAC-CE parts. Each MAC-CE part in the plurality of MAC-CE parts may include a respective codepoint list in the plurality of codepoint lists.

In one configuration, referring to FIG. 11, the one or more MAC-CEs at 1108 may include a single MAC-CE. The configuration of the plurality of codepoints may include a single codepoint list corresponding to all TRPs in the plurality of TRPs. Each codepoint in the plurality of codepoints may be associated with all TRPs in the plurality of TRPs.

In one configuration, the at least one codepoint may include a single codepoint.

In one configuration, the single MAC-CE may include a plurality of MAC-CE parts. Each MAC-CE part in the plurality of MAC-CE parts may be associated with a respective TRP in the plurality of TRPs.

In one configuration, each MAC-CE part in the plurality of MAC-CE parts may include an indication of whether the MAC-CE part is a last MAC-CE part.

In one configuration, the single MAC-CE may include an indication of a number of the plurality of MAC-CE parts.

In one configuration, the single MAC-CE may indicate, for each codepoint in the plurality of codepoints, a number of TCI states included in the codepoint. The single MAC-CE may indicate, for each TCI state included in the plurality of codepoints, one or more TRPs associated with the TCI state.

In one configuration, the single MAC-CE may further indicate, for each TCI state included in the plurality of codepoints, a type of the TCI state.

In one configuration, the single MAC-CE may include, for each codepoint in the plurality of codepoints, an indication of the number of TCI states included in the codepoint. The single MAC-CE includes, for each TCI state included in the plurality of codepoints, one or more TRP IDs associated with the one or more TRPs associated with the TCI state.

In one configuration, the single MAC-CE may include, for each TRP in the plurality of TRPs associated with each codepoint in the plurality of codepoints, an indication of a number of TCI states included in the codepoint for the TRP.

In one configuration, the single MAC-CE may include, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP.

In one configuration, each TRP in the plurality of TRPs may be associated with, in each codepoint in the plurality of codepoints, two or fewer TCI states. The joint indication may include 2 bits.

Figure 14:
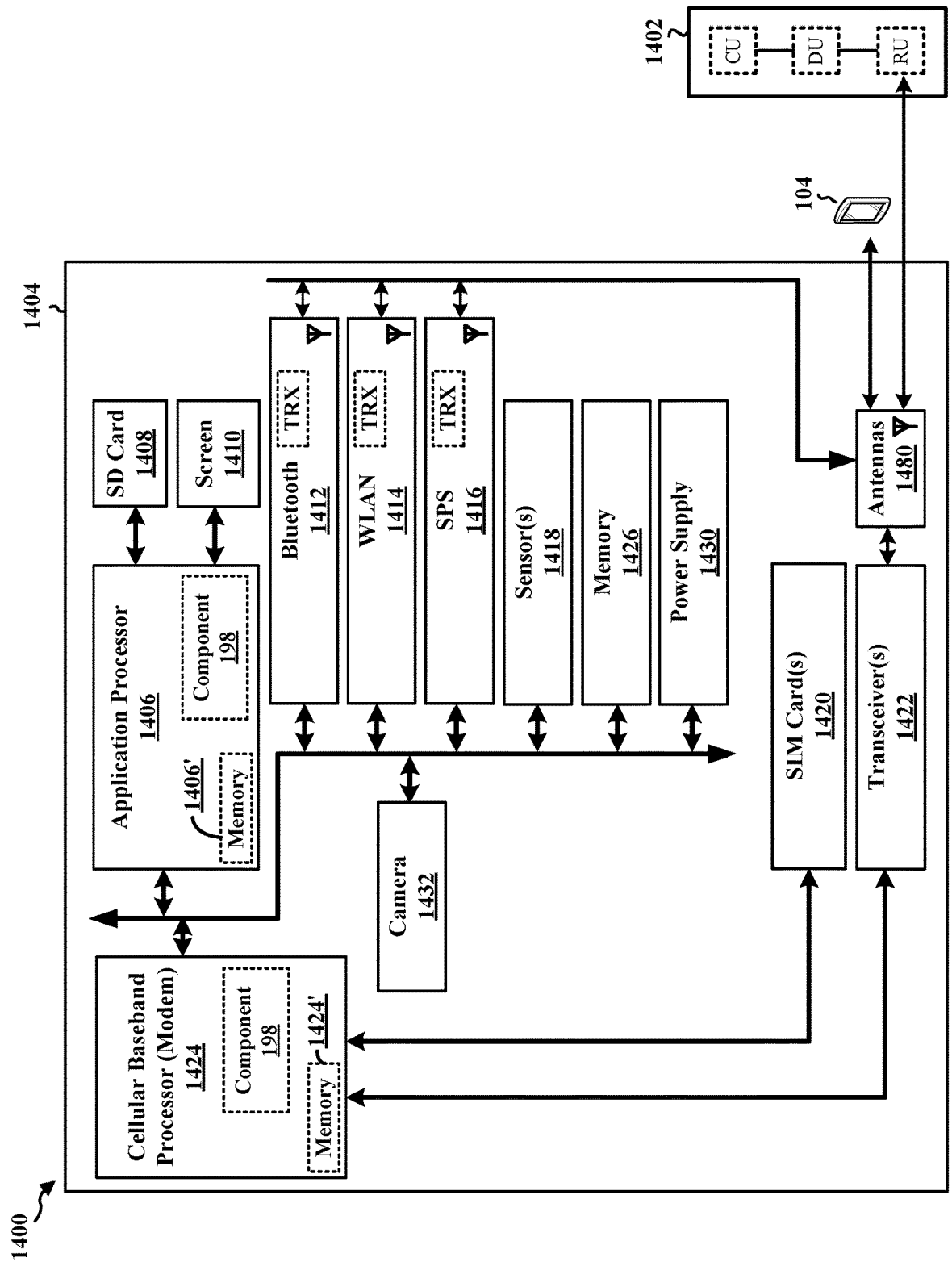
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include a cellular baseband processor 1424 (also referred to as a modem) coupled to one or more transceivers 1422 (e.g., cellular RF transceiver). The cellular baseband processor 1424 may include on-chip memory 1424'. In some aspects, the apparatus 1404 may further include one or more subscriber identity modules (SIM) cards 1420 and an application processor 1406 coupled to a secure digital (SD) card 1408 and a screen 1410. The application processor 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor 1424 communicates through the transceiver(s) 1422 via one or more antennas 1480 with the UE 104 and/or with an RU associated with a network entity 1402. The cellular baseband processor 1424 and the application processor 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor 1424 and the application processor 1406 are each responsible for general processing, including the execution of software stored on the computer-readable medium/memory. The software, when executed by the cellular baseband processor 1424/application processor 1406, causes the cellular baseband processor 1424/application processor 1406 to perform the various functions described supra. The computer-readable medium/memory may also be used for storing data that is manipulated by the cellular baseband processor 1424/application processor 1406 when executing software. The cellular baseband processor 1424/application processor 1406 may be a component of the UE 350 and may include the memory 360 and/or at least one of the TX processor 368, the RX processor 356, and the controller/processor 359. In one configuration, the apparatus 1404 may be a processor chip (modem and/or application) and include just the cellular baseband processor 1424 and/or the application processor 1406, and in another configuration, the apparatus 1404 may be the entire UE (e.g., see 350 of FIG. 3) and include the additional modules of the apparatus 1404.

As discussed supra, the component 198 is configured to receive an RRC message from a network node. The RRC message may include a configuration of a plurality of TCI states. Each TCI state in the plurality of TCI states may be associated with a respective TCI state ID. The component 198 is configured to receive one or more MAC-CEs from the network node. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The component 198 is configured to receive a single DCI message from the network node. The single DCI message may be indicative of at least one codepoint in the plurality of codepoints. The component 198 is configured to communicate with the network node based on the at least one codepoint. The component 198 may be within the cellular baseband processor 1424, the application processor 1406, or both the cellular baseband processor 1424 and the application processor 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1404 may include a variety of components configured for various functions. In one configuration, the apparatus 1404, and in particular the cellular baseband processor 1424 and/or the application processor 1406, includes means for receiving an RRC message from a network node. The RRC message may include a configuration of a plurality of TCI states. Each TCI state in the plurality of TCI states may be associated with a respective TCI state ID. The apparatus 1404, and in particular the cellular baseband processor 1424 and/or the application processor 1406, includes means for receiving one or more MAC-CEs from the network node. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The apparatus 1404, and in particular the cellular baseband processor 1424 and/or the application processor 1406, includes means for receiving a single DCI message from the network node. The single DCI message may be indicative of at least one codepoint in the plurality of codepoints. The apparatus 1404, and in particular the cellular baseband processor 1424 and/or the application processor 1406, includes means for communicating with the network node based on the at least one codepoint.

In one configuration, each TRP in the plurality of TRPs may be associated with a CORESET pool or a beam group. In one configuration, the single DCI message may further be indicative of at least one TCI state associated with the at least one codepoint. In one configuration, the configuration of the plurality of codepoints may include a plurality of codepoint lists. Each codepoint list in the plurality of codepoint lists may correspond to a respective TRP in the plurality of TRPs. In one configuration, each codepoint list in the plurality of codepoint lists may be associated with a codepoint list ID. In one configuration, each codepoint in the plurality of codepoints may be associated with a single TRP in the plurality of TRPs. In one configuration, the single DCI message may include a plurality of indications associated with the at least one codepoint. The at least one codepoint may include a respective codepoint for each TRP in the plurality of TRPs. Each indication in the plurality of indications may be associated with a respective TRP in the plurality of TRPs. In one configuration, the one or more MAC-CEs may include a plurality of MAC-CEs. Each MAC-CE in the plurality of MAC-CEs may include a respective codepoint list in the plurality of codepoint lists. In one configuration, the one or more MAC-CEs may include a single MAC-CE. The single MAC-CE may include a plurality of MAC-CE parts. Each MAC-CE part in the plurality of MAC-CE parts may include a respective codepoint list in the plurality of codepoint lists. In one configuration, the one or more MAC-CEs may include a single MAC-CE. The configuration of the plurality of codepoints may include a single codepoint list corresponding to all TRPs in the plurality of TRPs. Each codepoint in the plurality of codepoints may be associated with all TRPs in the plurality of TRPs. In one configuration, the at least one codepoint may include a single codepoint. In one configuration, the single MAC-CE may include a plurality of MAC-CE parts. Each MAC-CE part in the plurality of MAC-CE parts may be associated with a respective TRP in the plurality of TRPs. In one configuration, each MAC-CE part in the plurality of MAC-CE parts may include an indication of whether the MAC-CE part is a last MAC-CE part. In one configuration, the single MAC-CE may include an indication of a number of the plurality of MAC-CE parts. In one configuration, the single MAC-CE may indicate, for each codepoint in the plurality of codepoints, a number of TCI states included in the codepoint. The single MAC-CE may indicate, for each TCI state included in the plurality of codepoints, one or more TRPs associated with the TCI state. In one configuration, the single MAC-CE may further indicate, for each TCI state included in the plurality of codepoints, a type of the TCI state. In one configuration, the single MAC-CE may include, for each codepoint in the plurality of codepoints, an indication of the number of TCI states included in the codepoint. The single MAC-CE includes, for each TCI state included in the plurality of codepoints, one or more TRP IDs associated with the one or more TRPs associated with the TCI state. In one configuration, the single MAC-CE may include, for each TRP in the plurality of TRPs associated with each codepoint in the plurality of codepoints, an indication of a number of TCI states included in the codepoint for the TRP. In one configuration, the single MAC-CE may include, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP. In one configuration, each TRP in the plurality of TRPs may be associated with, in each codepoint in the plurality of codepoints, two or fewer TCI states. The joint indication may include 2 bits.

The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
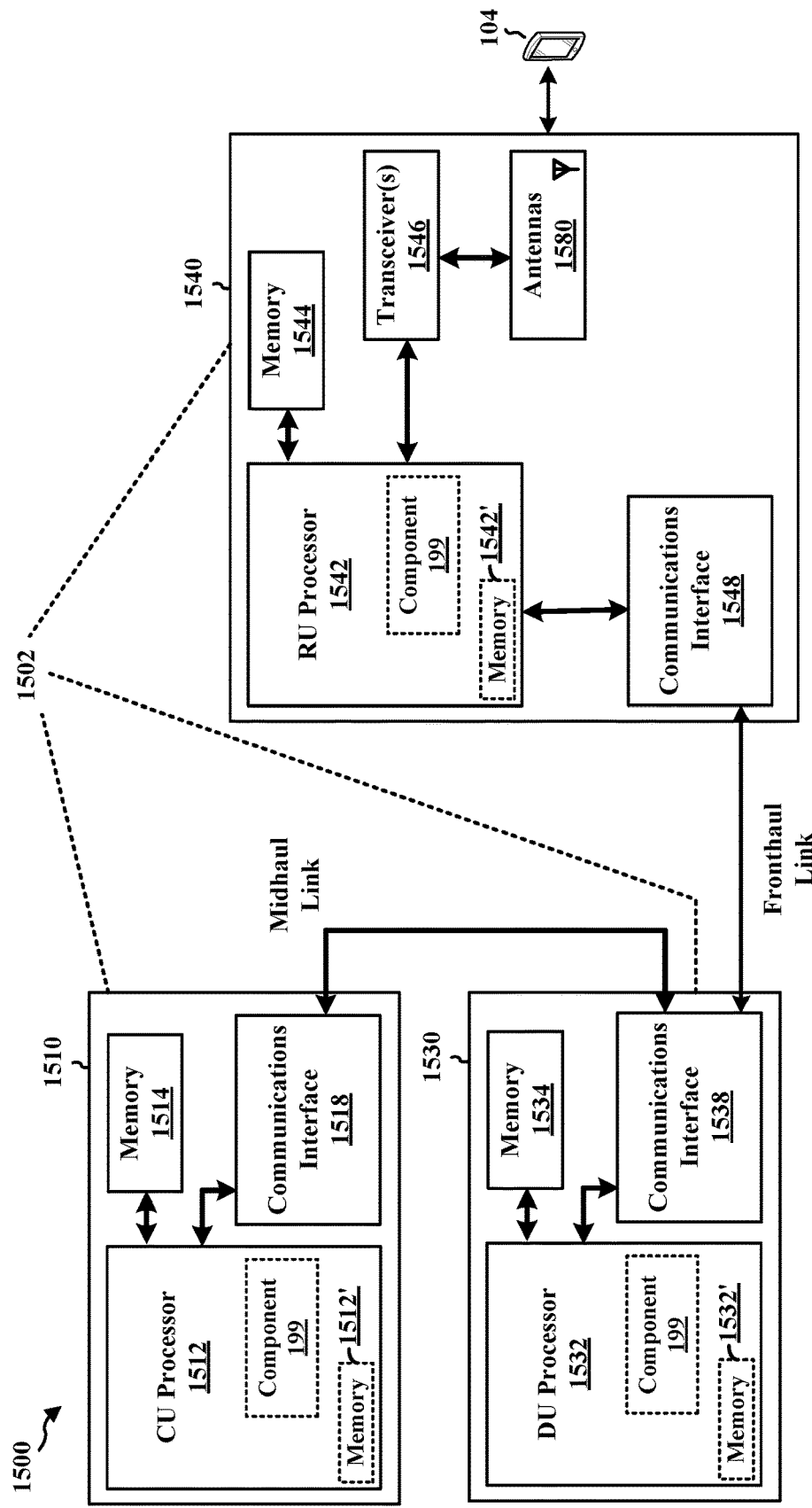
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include a CU processor 1512. The CU processor 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include a DU processor 1532. The DU processor 1532 may include on-chip memory 1532'. In some aspects, the DU 1530 may further include additional memory modules 1534 and a communications interface 1538. The DU 1530 communicates with the RU 1540 through a fronthaul link. The RU 1540 may include an RU processor 1542. The RU processor 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to transmit an RRC message to a UE. The RRC message may include a configuration of a plurality of TCI states. Each TCI state in the plurality of TCI states may be associated with a respective TCI state ID. The component 199 is configured to transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The component 199 is configured to transmit a single DCI message to the UE. The single DCI message may be indicative of at least one codepoint in the plurality of codepoints. The component 199 is configured to communicate with the UE based on the at least one codepoint. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1502 may include a variety of components configured for various functions. In one configuration, the network entity 1502 includes means for transmitting an RRC message to a UE. The RRC message may include a configuration of a plurality of TCI states. Each TCI state in the plurality of TCI states may be associated with a respective TCI state ID. The network entity 1502 includes means for transmitting one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The network entity 1502 includes means for transmitting a single DCI message to the UE. The single DCI message may be indicative of at least one codepoint in the plurality of codepoints. The network entity 1502 includes means for communicating with the UE based on the at least one codepoint.

In one configuration, each TRP in the plurality of TRPs may be associated with a CORESET pool or a beam group. In one configuration, the single DCI message may further be indicative of at least one TCI state associated with the at least one codepoint. In one configuration, the configuration of the plurality of codepoints may include a plurality of codepoint lists. Each codepoint list in the plurality of codepoint lists may correspond to a respective TRP in the plurality of TRPs. In one configuration, each codepoint list in the plurality of codepoint lists may be associated with a codepoint list ID. In one configuration, each codepoint in the plurality of codepoints may be associated with a single TRP in the plurality of TRPs. In one configuration, the single DCI message may include a plurality of indications associated with the at least one codepoint. The at least one codepoint may include a respective codepoint for each TRP in the plurality of TRPs. Each indication in the plurality of indications may be associated with a respective TRP in the plurality of TRPs. In one configuration, the one or more MAC-CEs may include a plurality of MAC-CEs. Each MAC-CE in the plurality of MAC-CEs may include a respective codepoint list in the plurality of codepoint lists. In one configuration, the one or more MAC-CEs may include a single MAC-CE. The single MAC-CE may include a plurality of MAC-CE parts. Each MAC-CE part in the plurality of MAC-CE parts may include a respective codepoint list in the plurality of codepoint lists. In one configuration, the one or more MAC-CEs may include a single MAC-CE. The configuration of the plurality of codepoints may include a single codepoint list corresponding to all TRPs in the plurality of TRPs. Each codepoint in the plurality of codepoints may be associated with all TRPs in the plurality of TRPs. In one configuration, the at least one codepoint may include a single codepoint. In one configuration, the single MAC-CE may include a plurality of MAC-CE parts. Each MAC-CE part in the plurality of MAC-CE parts may be associated with a respective TRP in the plurality of TRPs. In one configuration, each MAC-CE part in the plurality of MAC-CE parts may include an indication of whether the MAC-CE part is a last MAC-CE part. In one configuration, the single MAC-CE may include an indication of a number of the plurality of MAC-CE parts. In one configuration, the single MAC-CE may indicate, for each codepoint in the plurality of codepoints, a number of TCI states included in the codepoint. The single MAC-CE may indicate, for each TCI state included in the plurality of codepoints, one or more TRPs associated with the TCI state. In one configuration, the single MAC-CE may further indicate, for each TCI state included in the plurality of codepoints, a type of the TCI state. In one configuration, the single MAC-CE may include, for each codepoint in the plurality of codepoints, an indication of the number of TCI states included in the codepoint. The single MAC-CE includes, for each TCI state included in the plurality of codepoints, one or more TRP IDs associated with the one or more TRPs associated with the TCI state. In one configuration, the single MAC-CE may include, for each TRP in the plurality of TRPs associated with each codepoint in the plurality of codepoints, an indication of a number of TCI states included in the codepoint for the TRP. In one configuration, the single MAC-CE may include, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP. In one configuration, each TRP in the plurality of TRPs may be associated with, in each codepoint in the plurality of codepoints, two or fewer TCI states. The joint indication may include 2 bits.

The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-15, a network node may transmit an RRC message to a UE. The RRC message may include a configuration of a plurality of TCI states. Each TCI state in the plurality of TCI states may be associated with a respective TCI state ID. The network node may transmit one or more MAC-CEs to the UE. The one or more MAC-CEs may include a configuration of a plurality of codepoints. Each codepoint in the plurality of codepoints may be associated with one or more TRPs in a plurality of TRPs of the network node. Each codepoint in the plurality of codepoints may be further associated with, for each TRP associated with the codepoint, zero, one, or more TCI states in the plurality of TCI states. The plurality of codepoints may be associated with at least one first TCI state for an uplink communication and at least one second TCI state for a downlink communication. The network node may transmit a single DCI message to the UE. The single DCI message may be indicative of at least one codepoint in the plurality of codepoints. The network node may communicate with the UE based on the at least one codepoint. Accordingly, unified TCI states may be configured, activated, and/or indicated for multi-TRP operation.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a UE, including: receiving an RRC message from a network node, the RRC message including a configuration of a plurality of TCI states, each TCI state in the plurality of TCI states being associated with a respective TCI state ID; receiving one or more MAC-CEs from the network node, the one or more MAC-CEs including a configuration of a plurality of codepoints, each codepoint in the plurality of codepoints being associated with one or more TRPs in a plurality of TRPs of the network node, each codepoint in the plurality of codepoints being further associated with, for each TRP associated with the codepoint, zero, one, or more TCI states in the plurality of TCI states, where the plurality of codepoints are associated with at least one first TCI state for an uplink communication and at least one second TCI state for a downlink communication; receiving a single DCI message from the network node, the single DCI message being indicative of at least one codepoint in the plurality of codepoints; and communicating with the network node based on the at least one codepoint.

Aspect 2 is the method of aspect 1, where each TRP in the plurality of TRPs is associated with a CORESET pool or a beam group.

Aspect 3 is the method of any of aspects 1 and 2, where the single DCI message is further indicative of at least one TCI state associated with the at least one codepoint.

Aspect 4 is the method of any of aspects 1 to 3, where the configuration of the plurality of codepoints includes a plurality of codepoint lists, and each codepoint list in the plurality of codepoint lists corresponds to a respective TRP in the plurality of TRPs.

Aspect 5 is the method of aspect 4, where each codepoint list in the plurality of codepoint lists is associated with a codepoint list ID.

Aspect 6 is the method of any of aspects 4 and 5, where each codepoint in the plurality of codepoints is associated with a single TRP in the plurality of TRPs.

Aspect 7 is the method of any of aspects 4 to 6, where the single DCI message includes a plurality of indications associated with the at least one codepoint, the at least one codepoint includes a respective codepoint for each TRP in the plurality of TRPs, and each indication in the plurality of indications is associated with a respective TRP in the plurality of TRPs.

Aspect 8 is the method of any of aspects 4 to 7, where the one or more MAC-CEs include a plurality of MAC-CEs, and each MAC-CE in the plurality of MAC-CEs includes a respective codepoint list in the plurality of codepoint lists.

Aspect 9 is the method of any of aspects 4 to 7, where the one or more MAC-CEs include a single MAC-CE, the single MAC-CE includes a plurality of MAC-CE parts, and each MAC-CE part in the plurality of MAC-CE parts includes a respective codepoint list in the plurality of codepoint lists.

Aspect 10 is the method of any of aspects 1 to 3, where the one or more MAC-CEs include a single MAC-CE, the configuration of the plurality of codepoints includes a single codepoint list corresponding to all TRPs in the plurality of TRPs, and each codepoint in the plurality of codepoints is associated with all TRPs in the plurality of TRPs.

Aspect 11 is the method of aspect 10, where the at least one codepoint includes a single codepoint.

Aspect 12 is the method of any of aspects 10 and 11, where the single MAC-CE includes a plurality of MAC-CE parts, and each MAC-CE part in the plurality of MAC-CE parts is associated with a respective TRP in the plurality of TRPs.

Aspect 13 is the method of aspect 12, where each MAC-CE part in the plurality of MAC-CE parts includes an indication of whether the MAC-CE part is a last MAC-CE part; or the single MAC-CE includes an indication of a number of the plurality of MAC-CE parts.

Aspect 14 is the method of any of aspects 10 and 11, where the single MAC-CE indicates, for each codepoint in the plurality of codepoints, a number of TCI states included in the codepoint, and the single MAC-CE indicates, for each TCI state included in the plurality of codepoints, one or more TRPs associated with the TCI state.

Aspect 15 is the method of aspect 14, where the single MAC-CE further indicates, for each TCI state included in the plurality of codepoints, a type of the TCI state.

Aspect 16 is the method of any of aspects 14 and 15, where the single MAC-CE includes, for each codepoint in the plurality of codepoints, an indication of the number of TCI states included in the codepoint, and the single MAC-CE includes, for each TCI state included in the plurality of codepoints, one or more TRP IDs associated with the one or more TRPs associated with the TCI state.

Aspect 17 is the method of aspect 14, where the single MAC-CE includes, for each TRP in the plurality of TRPs associated with each codepoint in the plurality of codepoints, an indication of a number of TCI states included in the codepoint for the TRP.

Aspect 18 is the method of aspect 14, where the single MAC-CE includes, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP.

Aspect 19 is the method of aspect 18, where each TRP in the plurality of TRPs is associated with, in each codepoint in the plurality of codepoints, two or fewer TCI states, and the joint indication includes 2 bits.

Aspect 20 is a method for wireless communication at a network node, including: transmitting an RRC message to a UE, the RRC message including a configuration of a plurality of TCI states, each TCI state in the plurality of TCI states being associated with a respective TCI state ID; transmitting one or more MAC-CEs to the UE, the one or more MAC-CEs including a configuration of a plurality of codepoints, each codepoint in the plurality of codepoints being associated with one or more TRPs in a plurality of TRPs of the network node, each codepoint in the plurality of codepoints being further associated with, for each TRP associated with the codepoint, zero, one, or more TCI states in the plurality of TCI states, where the plurality of codepoints are associated with at least one first TCI state for an uplink communication and at least one second TCI state for a downlink communication; transmitting a single DCI message to the UE, the single DCI message being indicative of at least one codepoint in the plurality of codepoints; and communicating with the UE based on the at least one codepoint.

Aspect 21 is the method of aspect 20, where each TRP in the plurality of TRPs is associated with a CORESET pool or a beam group.

Aspect 22 is the method of any of aspects 20 and 21, where the single DCI message is further indicative of at least one TCI state associated with the at least one codepoint.

Aspect 23 is the method of any of aspects 20 to 22, where the configuration of the plurality of codepoints includes a plurality of codepoint lists, and each codepoint list in the plurality of codepoint lists corresponds to a respective TRP in the plurality of TRPs.

Aspect 24 is the method of aspect 23, where each codepoint list in the plurality of codepoint lists is associated with a codepoint list ID.

Aspect 25 is the method of any of aspects 23 and 24, where each codepoint in the plurality of codepoints is associated with a single TRP in the plurality of TRPs.

Aspect 26 is the method of any of aspects 23 to 25, where the single DCI message includes a plurality of indications associated with the at least one codepoint, the at least one codepoint includes a respective codepoint for each TRP in the plurality of TRPs, and each indication in the plurality of indications is associated with a respective TRP in the plurality of TRPs.

Aspect 27 is the method of any of aspects 23 to 26, where the one or more MAC-CEs include a plurality of MAC-CEs, and each MAC-CE in the plurality of MAC-CEs includes a respective codepoint list in the plurality of codepoint lists.

Aspect 28 is the method of any of aspects 23 to 26, where the one or more MAC-CEs include a single MAC-CE, the single MAC-CE includes a plurality of MAC-CE parts, and each MAC-CE part in the plurality of MAC-CE parts includes a respective codepoint list in the plurality of codepoint lists.

Aspect 29 is the method of any of aspects 20 to 22, where the one or more MAC-CEs include a single MAC-CE, the configuration of the plurality of codepoints includes a single codepoint list corresponding to all TRPs in the plurality of TRPs, and each codepoint in the plurality of codepoints is associated with all TRPs in the plurality of TRPs.

Aspect 30 is the method of aspect 29, where the at least one codepoint includes a single codepoint.

Aspect 31 is the method of any of aspects 29 and 30, where the single MAC-CE includes a plurality of MAC-CE parts, and each MAC-CE part in the plurality of MAC-CE parts is associated with a respective TRP in the plurality of TRPs.

Aspect 32 is the method of aspect 31, where each MAC-CE part in the plurality of MAC-CE parts includes an indication of whether the MAC-CE part is a last MAC-CE part; or the single MAC-CE includes an indication of a number of the plurality of MAC-CE parts.

Aspect 33 is the method of any of aspects 29 and 30, where the single MAC-CE indicates, for each codepoint in the plurality of codepoints, a number of TCI states included in the codepoint, and the single MAC-CE indicates, for each TCI state included in the plurality of codepoints, one or more TRPs associated with the TCI state.

Aspect 34 is the method of aspect 33, where the single MAC-CE further indicates, for each TCI state included in the plurality of codepoints, a type of the TCI state.

Aspect 35 is the method of any of aspects 33 and 34, where the single MAC-CE includes, for each codepoint in the plurality of codepoints, an indication of the number of TCI states included in the codepoint, and the single MAC-CE includes, for each TCI state included in the plurality of codepoints, one or more TRP IDs associated with the one or more TRPs associated with the TCI state.

Aspect 36 is the method of aspect 33, where the single MAC-CE includes, for each TRP in the plurality of TRPs associated with each codepoint in the plurality of codepoints, an indication of a number of TCI states included in the codepoint for the TRP.

Aspect 37 is the method of aspect 33, where the single MAC-CE includes, for each TRP in the plurality of TRPs associated with each codepoint in the plurality of codepoints, a joint indication of a number of TCI states included in the codepoint for the TRP and a TCI state type for each TCI state in the TCI states included in the codepoint for the TRP.

Aspect 38 is the method of aspect 37, where each TRP in the plurality of TRPs is associated with, in each codepoint in the plurality of codepoints, two or fewer TCI states, and the joint indication includes 2 bits.

Aspect 39 is an apparatus for wireless communication including at least one processor coupled to a memory and, based at least in part on information stored in the memory, the at least one processor is configured to implement a method as in any of aspects 1 to 38.

Aspect 40 may be combined with aspect 39 and further includes a transceiver coupled to the at least one processor.

Aspect 41 is an apparatus for wireless communication including means for implementing any of aspects 1 to 38.

Aspect 42 is a non-transitory computer-readable storage medium storing computer executable code, where the code when executed by a processor causes the processor to implement any of aspects 1 to 38.

Various aspects have been described herein. These and other aspects are within the scope of the following claims.

What is claimed is:

1. An apparatus for wireless communication at a user equipment (UE), comprising:
   memory; and
   at least one processor coupled to the memory and, based at least in part on information stored in the memory, the at least one processor is configured to:
   receive a radio resource control (RRC) message from a network node, the RRC message including a first configuration of a plurality of transmission configuration indicator (TCI) states, each TCI state in the plurality of TCI states being associated with a respective TCI state identifier (ID);
   receive one or more medium access control-control elements (MAC-CEs) from the network node, the one or more MAC-CEs including a second configuration of a plurality of codepoints, each codepoint in the plurality of codepoints being associated with one or more transmit receive points (TRPs) in a plurality of TRPs of the network node, wherein the second configuration of the plurality of codepoints comprises a plurality of fields, a number of the plurality of fields enabling an indication of more than one TCI state for each codepoint, and wherein each field of the plurality of fields:
   comprises one or more bits,
   corresponds to a codepoint and one TCI state of the more than one TCI state, and
   indicates whether a joint TCI state is associated with the codepoint and the one TCI state corresponding to the field;
   receive a single downlink control information (DCI) message from the network node, the single DCI message being indicative of at least one codepoint in the plurality of codepoints; and
   communicate with the network node based on the at least one codepoint.

2. The apparatus of claim 1, wherein each TRP in the plurality of TRPs is associated with a control resource set (CORESET) pool or a beam group.

3. The apparatus of claim 1, wherein the single DCI message is further indicative of at least one TCI state associated with the at least one codepoint.

4. The apparatus of claim 1, wherein the one or more MAC-CEs include a single MAC-CE, the configuration of the plurality of codepoints includes a single codepoint list corresponding to all TRPs in the plurality of TRPs, and each codepoint in the plurality of codepoints is associated with all TRPs in the plurality of TRPs.

5. The apparatus of claim 4, wherein the at least one codepoint includes a single codepoint.

6. The apparatus of claim 4, wherein the single MAC-CE includes a plurality of MAC-CE parts, and wherein each MAC-CE part in the plurality of MAC-CE parts is associated with a respective TRP in the plurality of TRPs and includes a respective TRP ID of the respective TRP in an octet that includes a respective BWP ID.

7. The apparatus of claim 6, wherein
   each MAC-CE part in the plurality of MAC-CE parts includes a first indication of whether the MAC-CE part is a last MAC-CE part; or
   the single MAC-CE includes a second indication of a number of the plurality of MAC-CE parts.

8. The apparatus of claim 4, wherein the single MAC-CE indicates, for each codepoint in the plurality of codepoints, a number of TCI states included in the codepoint, and the single MAC-CE indicates, for each TCI state included in the plurality of codepoints, one or more TRPs associated with the TCI state.

9. The apparatus of claim 8, wherein the single MAC-CE further indicates, for each TCI state included in the plurality of codepoints, a type of the TCI state.

10. The apparatus of claim 8, wherein the single MAC-CE includes, for each codepoint in the plurality of codepoints, an indication of the number of TCI states included in the codepoint, and the single MAC-CE includes, for each TCI state included in the plurality of codepoints.

11. The apparatus of claim 8, wherein the single MAC-CE includes, for each TRP in the plurality of TRPs associated with each codepoint in the plurality of codepoints, an indication of the number of TCI states included in the codepoint for the TRP.

12. The apparatus of claim 8, wherein the single MAC-CE includes, for each TRP in the plurality of TRPs associated with each codepoint in the plurality of codepoints, a joint indication of the number of TCI states included in the codepoint for the TRP and a TCI state type for each TCI state in the TCI states included in the codepoint for the TRP.

13. The apparatus of claim 12, wherein each TRP in the plurality of TRPs is associated with, in each codepoint in the plurality of codepoints, two or fewer TCI states, and the joint indication includes 2 bits.

14. The apparatus of claim 1, further comprising a transceiver coupled to the at least one processor.

15. A method of wireless communication at a user equipment (UE), comprising:
receiving a radio resource control (RRC) message from a network node, the RRC message including a first configuration of a plurality of transmission configuration indicator (TCI) states, each TCI state in the plurality of TCI states being associated with a respective TCI state identifier (ID);
receiving one or more medium access control-control elements (MAC-CEs) from the network node, the one or more MAC-CEs including a second configuration of a plurality of codepoints, each codepoint in the plurality of codepoints being associated with one or more transmit receive points (TRPs) in a plurality of TRPs of the network node, wherein the second configuration of the plurality of codepoints comprises a plurality of fields, a number of the plurality of fields enabling an indication of more than one TCI state for each codepoint, and wherein each field of the plurality of fields:
comprises one or more bits,
corresponds to a codepoint and one TCI state of the more than one TCI state, and
indicates whether a joint TCI state is associated with the codepoint and the one TCI state corresponding to the field;
receiving a single downlink control information (DCI) message from the network node, the single DCI message being indicative of at least one codepoint in the plurality of codepoints; and
communicating with the network node based on the at least one codepoint.

16. An apparatus for wireless communication at a network node, comprising:
memory; and
at least one processor coupled to the memory and, based at least in part on information stored in the memory, the at least one processor is configured to:
transmit a radio resource control (RRC) message to a user equipment (UE), the RRC message including a first configuration of a plurality of transmission configuration indicator (TCI) states, each TCI state in the plurality of TCI states being associated with a respective TCI state identifier (ID);
transmit one or more medium access control-control elements (MAC-CEs) to the UE, the one or more MAC-CEs including a second configuration of a plurality of codepoints, each codepoint in the plurality of codepoints being associated with one or more transmit receive points (TRPs) in a plurality of TRPs of the network node, wherein the second configuration of the plurality of codepoints comprises a plurality of fields, a number of the plurality of fields enabling an indication of more than one TCI state for each codepoint, and wherein each field of the plurality of fields:
comprises one or more bits,
corresponds to a codepoint and one TCI state of the more than one TCI state, and
indicates whether a joint TCI state is associated with the codepoint and the one TCI state corresponding to the field;
transmit a single downlink control information (DCI) message to the UE, the single DCI message being indicative of at least one codepoint in the plurality of codepoints; and
communicate with the UE based on the at least one codepoint.

17. The apparatus of claim 16, wherein each TRP in the plurality of TRPs is associated with a control resource set (CORESET) pool or a beam group.

18. The apparatus of claim 16, wherein the single DCI message is further indicative of at least one TCI state associated with the at least one codepoint.

19. The apparatus of claim 16, wherein the one or more MAC-CEs include a single MAC-CE, the configuration of the plurality of codepoints includes a single codepoint list corresponding to all TRPs in the plurality of TRPs, and each codepoint in the plurality of codepoints is associated with all TRPs in the plurality of TRPs.

20. The apparatus of claim 19, wherein the at least one codepoint includes a single codepoint.

21. The apparatus of claim 19, wherein the single MAC-CE includes a plurality of MAC-CE parts, and wherein each MAC-CE part in the plurality of MAC-CE parts is associated with a respective TRP in the plurality of TRPs and includes a respective TRP ID of the respective TRP in an octet that includes a respective BWP ID.

22. The apparatus of claim 21, wherein
each MAC-CE part in the plurality of MAC-CE parts includes a first indication of whether the MAC-CE part is a last MAC-CE part; or
the single MAC-CE includes a second indication of a number of the plurality of MAC-CE parts.

23. The apparatus of claim 19, wherein the single MAC-CE indicates, for each codepoint in the plurality of codepoints, a number of TCI states included in the codepoint, and the single MAC-CE indicates, for each TCI state included in the plurality of codepoints, one or more TRPs associated with the TCI state.

24. The apparatus of claim 23, wherein the single MAC-CE further indicates, for each TCI state included in the plurality of codepoints, a type of the TCI state.

25. The apparatus of claim 23, wherein the single MAC-CE includes, for each codepoint in the plurality of codepoints, an indication of the number of TCI states included in the codepoint, and the single MAC-CE includes, for each TCI state included in the plurality of codepoints.

26. The apparatus of claim 23, wherein the single MAC-CE includes, for each TRP in the plurality of TRPs associated with each codepoint in the plurality of codepoints, an indication of the number of TCI states included in the codepoint for the TRP.

27. The apparatus of claim 23, wherein the single MAC-CE includes, for each TRP in the plurality of TRPs associated with each codepoint in the plurality of codepoints, a joint indication of the number of TCI states included in the codepoint for the TRP and a TCI state type for each TCI state in the TCI states included in the codepoint for the TRP.

28. The apparatus of claim 27, wherein each TRP in the plurality of TRPs is associated with, in each codepoint in the plurality of codepoints, two or fewer TCI states, and the joint indication includes 2 bits.

29. The apparatus of claim 16, further comprising a transceiver coupled to the at least one processor.

30. A method of wireless communication at a network node, comprising:
transmitting a radio resource control (RRC) message to a user equipment (UE), the RRC message including a first configuration of a plurality of transmission configuration indicator (TCI) states, each TCI state in the plurality of TCI states being associated with a respective TCI state identifier (ID);

transmitting one or more medium access control-control elements (MAC-CEs) to the UE, the one or more MAC-CEs including a second configuration of a plurality of codepoints, each codepoint in the plurality of codepoints being associated with one or more transmit receive points (TRPs) in a plurality of TRPs of the network node, wherein the second configuration of the plurality of codepoints comprises a plurality of fields, a number of the plurality of fields enabling an indication of more than one TCI state for each codepoint, and wherein each field of the plurality of fields:

comprises one or more bits, corresponds to a codepoint and one TCI state of the more than one TCI state, and indicates whether a joint TCI state is associated with the codepoint and the one TCI state corresponding to the field;

transmitting a single downlink control information (DCI) message to the UE, the single DCI message being indicative of at least one codepoint in the plurality of codepoints; and communicating with the UE based on the at least one codepoint.

\* \* \* \* \*